United States Patent
Spangler et al.

(10) Patent No.: US 8,464,038 B2
(45) Date of Patent: Jun. 11, 2013

(54) COMPUTING DEVICE WITH DEVELOPER MODE

(75) Inventors: Randall R. Spangler, San Jose, CA (US); Ryan Tabone, San Francisco, CA (US); Anton Staaf, San Jose, CA (US); Christopher Masone, Burlingame, CA (US); Matthew Papakipos, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 548 days.

(21) Appl. No.: 12/721,202

(22) Filed: Mar. 10, 2010

(65) Prior Publication Data

US 2011/0087870 A1 Apr. 14, 2011

Related U.S. Application Data

(60) Provisional application No. 61/251,293, filed on Oct. 13, 2009.

(51) Int. Cl.
*G06F 9/00* (2006.01)
*G06F 9/24* (2006.01)
*G06F 15/177* (2006.01)
*G06F 1/24* (2006.01)
*G06F 7/04* (2006.01)
*G06F 17/30* (2006.01)

(52) U.S. Cl.
USPC .................. 713/2; 713/1; 713/100; 713/189; 726/2; 726/26

(58) Field of Classification Search
None
See application file for complete search history.

(56) References Cited

U.S. PATENT DOCUMENTS

| | | | | |
|---|---|---|---|---|
| 6,185,678 | B1 * | 2/2001 | Arbaugh et al. | 713/2 |
| 6,253,374 | B1 * | 6/2001 | Dresevic et al. | 717/126 |
| 6,363,492 | B1 * | 3/2002 | James et al. | 714/1 |
| 7,549,922 | B2 * | 6/2009 | Falvey et al. | 463/29 |
| 7,822,997 | B2 * | 10/2010 | Boerger | 713/300 |
| 7,849,315 | B2 * | 12/2010 | Hardy et al. | 713/170 |
| 7,853,780 | B2 * | 12/2010 | Rotondo et al. | 713/2 |
| 8,001,581 | B2 * | 8/2011 | Ford et al. | 726/2 |
| 8,131,987 | B2 * | 3/2012 | Lo et al. | 713/2 |
| 2008/0010220 | A1 * | 1/2008 | Hobson et al. | 705/76 |
| 2008/0165971 | A1 | 7/2008 | Cesare | |

(Continued)

FOREIGN PATENT DOCUMENTS

WO 2011/047061 A2 4/2011

OTHER PUBLICATIONS

PCT Search Report for International Application No. PCT/US2010/052523, mailed Mar. 10, 2011, 9 pages.

(Continued)

*Primary Examiner* — Ji H Bae
(74) *Attorney, Agent, or Firm* — Brake Hughes Bellerman LLP

(57) ABSTRACT

Methods and apparatus for implementing modes of operation of computing device are disclosed. An example apparatus includes a mode-selection input device having a first state and a second state. The example apparatus also includes firmware operably coupled with the mode-selection input device. In the example apparatus, when the mode-selection input device is in the first state, the firmware is configured to cause the computing device to operate in a first mode of operation, a user mode. In the example apparatus, when the mode-selection input device is in the second state, the firmware is configured to cause the computing device to operate in second mode of operation, a developer mode.

51 Claims, 13 Drawing Sheets

U.S. PATENT DOCUMENTS

2009/0191961 A1* 7/2009 McCoull et al. .............. 463/29
2009/0210702 A1* 8/2009 Welingkar et al. ........... 713/156
2012/0210113 A1* 8/2012 Wood et al. .................... 713/2

OTHER PUBLICATIONS

Arbaugh, et al, "Automated Recovery in a Secure Bootstrap Process", Distributed System Laboratory, Nov. 21, 1997, 16 pages.

Miller, "The Secret to Palm Pre Dev Mode Lies in the Konami Code", engadget, retrieved on Feb. 8, 2011 from http://www.engadget.com/2009/06/10/the-secret-to-palm-pre-dev-mode-lies-in-the-konami-code/, Jun. 10, 2009, 4 pages.

"Mini Switch Under Battery", Maemo.org, retrieved on Feb. 8, 2011 from http://talk.maemo.org/showthread.php?t=12802, Jun. 12, 2007, 4 pages.

"OLPC Firmware q2e18", OLPC Project, retrieved on Feb. 8, 2011 from http://wiki.laptop.org/go/OLPC_Firmware_q2e18, Sep. 17, 2008, 6 pages.

Search Report for International Application No. PCT/US10/52523, mailed Jul. 13, 2011, 16 pages.

"Firmware Boot and Recovery", The Chromium Projects, Nov. 19, 2009, 14 pages.

"The Chromium Projects", Abstract, Mar. 10, 2010, 9 pages.

* cited by examiner

COMPUTING DEVICE WITH DEVELOPER MODE

CROSS REFERENCE TO RELATED APPLICATIONS

This application claims the benefit under 35 U.S.C. §119 (e) of U.S. Provisional Patent Application Ser. No. 61/251,293, filed on Oct. 13, 2009. The disclosure of U.S. Provisional Application 61/251,293 is incorporated by reference herein in its entirety.

TECHNICAL FIELD

This description relates generally to computing devices.

BACKGROUND

Manufacturers of commercial electronics (computing devices) are often faced with various design challenges when developing such computing devices. For instance, manufacturers of computing device such as personal computers, laptop computers and netbook computers are faced with two competing concerns for device that may be used by average users as well as technically-savvy users (e.g., software and/or hardware developers).

The first of these competing concerns is to make such computing devices secure for average users that purchase those devices for personal or business use. The second of these competing concerns is to make the components and/or sub-systems of those same computing devices easily accessible to technically-savvy users, so that such technically-savvy users may perform development activities using such computing devices. Such development activities may include creating user applications, creating utility applications (e.g., device drivers) and/or creating operating systems for such computing devices.

These two concerns are usually competing, or at odds with each other, because measures that are taken to make a computing device secure for an average user are often limiting to development activities, while highly accessible devices that are well suited for development activities are usually less secure for average users and may not offer sufficient protection for user data, such as for personal information including identity and financial information, for example.

SUMMARY

In a first general aspect, a computing device includes a mode-selection input device having a first state and a second state and firmware operably coupled with the mode-selection input device. In the computing the device, when the mode-selection input device is in the first state, the firmware is configured to cause the computing device to determine whether machine-readable instructions executed by the computing device are digitally signed by a trusted supplier of an operating system of the computing device.

Further in the computing device, when the machine-readable instructions are digitally signed by the trusted supplier, the computing device is configured to execute the machine-readable instructions. Also, when the machine-readable instructions are not digitally signed by the trusted supplier, the computing device is configured to execute a recovery procedure to install machine-readable instructions that are digitally signed by the trusted supplier on the computing device. Still further in the computing device, when the mode-selection input device is in the second state, the firmware is configured to cause the computing device to operate in a developer mode, such that the computing device executes machine-readable instructions that are not digitally signed by the trusted supplier.

In a second general aspect, a computer implemented method includes determining, by a computing device, a state of a mode-selection input device of the computing device, where the mode-selection input device has a first state and a second state. In the method, when the mode-selection input device is in the first state, the method includes operating the computing device in a user mode. The user mode includes determining whether machine-readable instructions executed by the computing device are digitally signed by a trusted supplier of an operating system of the computing device.

When the machine-readable instructions are digitally signed by the trusted supplier, the method includes executing, by the computing device, the machine-readable instructions. Further in the method, when the machine-readable instructions are not digitally signed by the trusted supplier, the method includes executing, by the computing device, a recovery procedure to install an operating system recovery image on the computing device. Further in the method, when the mode-selection input device is in the second state, the method includes operating the computing device in a developer mode, such that the computing device executes machine-readable instructions that are not digitally signed by the trusted supplier.

BRIEF DESCRIPTION OF THE DRAWINGS

Like reference symbols in the various drawings indicate like elements.

DETAILED DESCRIPTION

Figure 1:
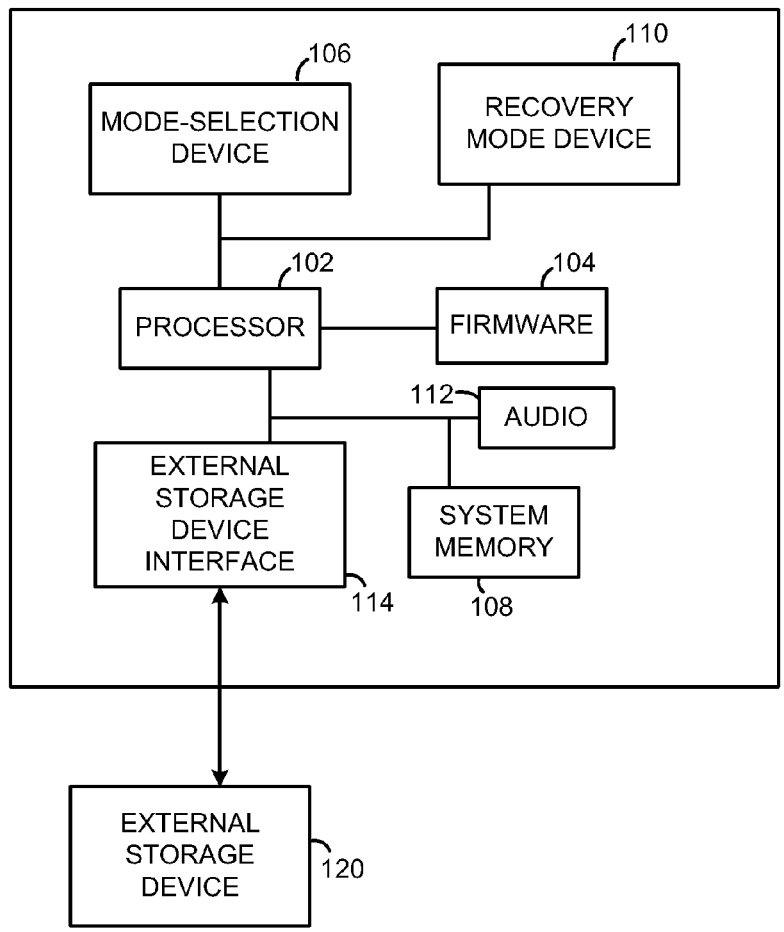
FIG. 1 is a block diagram illustrating a computing device in accordance with an example embodiment.
Figure 8:
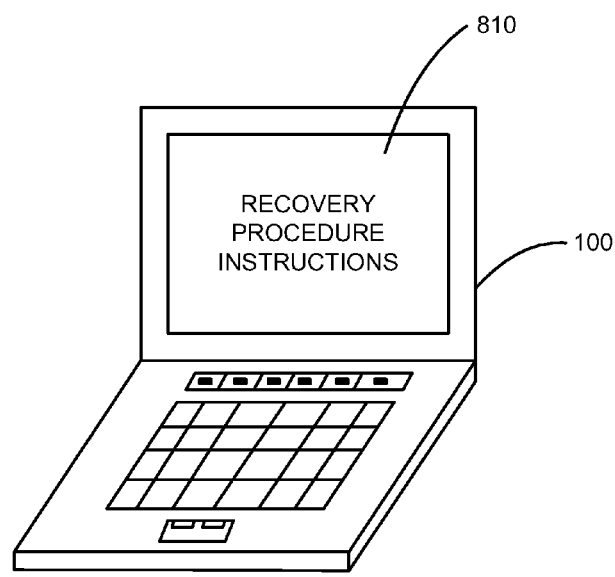
FIG. 8 is a diagram illustrating a computing device with a display in accordance with an example embodiment that may be use in conjunction with the method illustrated in FIG. 7.
Figure 10:
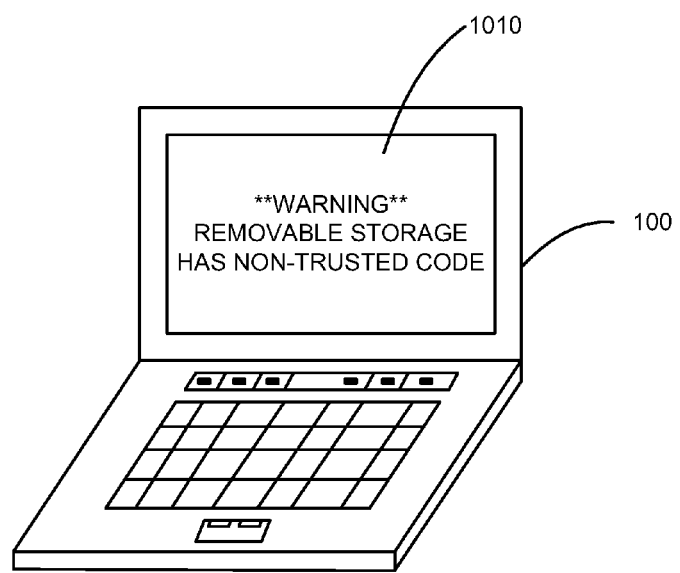
FIG. 10 is a diagram illustrating a computing device with a display in accordance with an example embodiment that may be use in conjunction with the method illustrated in FIG. 9.

FIG. 1 is a block diagram illustrating a computing device 100 in accordance with an example embodiment. While the computing device 100 is shown in one particular configuration, it will be understood that the computing device 100 may include additional, alternative, or fewer elements. As some examples, the computing device 100 may include a display (such as shown in FIGS. 8 and 10), a wireless network interface card, or a number of other devices or elements. Also, the elements of the computing device 100 may be combined and/or integrated with one another in a number of appropriate combinations.

As shown in FIG. 1, the computing device 100 includes a processor 102. The processor 102 may be used to control the various elements of the computing device 100 by, for example, executing machine-readable instructions that are stored in firmware 104, in system memory 108 and/or in an external storage device 120. The system memory 108 may include cache memory, random access memory, one or more hard drives (e.g., a flash memory drive, a magnetic drive or an optical drive), as well as other types of data memory devices. The processor 102 may also execute machine-readable instructions that are obtained from other sources, such a via a network interface, for example.

The firmware 104 may include instructions that are executed by the processor 102 when booting the computing device 100. The instructions stored in the firmware 104 may then direct the processor 102 to execute and/or load instructions that are stored in the system memory 108. In other instances, the instructions in the firmware 104 may instruct the processor 102 to execute and/or load instructions that are stored on the external (removable) data storage device 120, which may be operably coupled with the computing device 100 via an external storage device interface 114. For instance, the removable data storage device 120 may be a universal serial bus (USB) drive or a secure digital (SD) card, and the interface 114 may be, respectively, a USB data port or a SD card reader. In other embodiments, the external storage device 120 and the interface 114 may take other forms.

The computing device 100 also includes a mode-selection input device 106. The mode-selection input device 106 may be implemented in a number of fashions in the computing device 100. For instance the mode-selection input device 106 may take the form of a switch. In other embodiments, the mode-selection input device may be implemented as a bar-code reader. In still other embodiments, the mode-selection input device 106 may take other appropriate forms.

In the computing device 100, the mode-selection input device 106 may have a first state and a second state. The computing device 100 may check the state of the mode-selection input device 106, for example, during a boot sequence of the computing device 100 or when operation of the computing device 100 is resumed from a suspend mode, for example, to determine an operating mode for the computing device 100. In other embodiments, the computing device 100 may check the state of the mode-selection input device 106 on a periodic basis, rather than in response to a particular event, such as device boot or resume from suspend.

Depending on the particular arrangement, the computing device 100 may check the state of the mode-selection device 106 using instructions stored in firmware 104, instructions stored in the system memory 108 and/or instructions stored on the external storage device 120. The specific techniques for checking the state of the mode-selection device 106 may depend on a number of factors, such as, for example, whether the computing device is being booted or being resumed from suspend. Furthermore, the computing device 100 may perform a number of different operations and/or procedures, such as those described herein, in response to the specific state of the mode-selection device 106, as well as based on other factors.

While such operations and procedures are discussed in further detail below, briefly, as one example, the computing device 100 may execute a new image installation procedure, which may include copying machine-readable instructions from the external storage device 120 and executing and/or storing the copied instructions in the firmware 104 and/or the system memory 108. As another example, the computing device 100 may execute a recovery procedure, which may include restoring operating software (e.g., boot operations and/or an operating system) of the computing device 100 (e.g., in the firmware 104 and/or the system memory 108) to a known and trusted state. Such a recovery procedure may include copying machine-readable instructions that are digitally signed by a trusted supplier from the external storage device 120 and storing the signed instructions in the firmware 104 and/or the system memory 108.

As yet another example, the computing device 100 may boot in a developer mode, for example, using machine readable instructions stored in the firmware 104 and the system memory 108 that are not digitally signed by the trusted supplier. Of course, other operations for the computing device 100 are possible, and the specific techniques discussed herein are given by way of example.

In the above example where the mode-selection device 106 is implemented using a switch, the state of the mode-selection device 106 may be changed between the first and second states by changing the position of the switch. Similarly, in the example where the mode-selection device 106 is implemented using a bar code reader, the state of the mode-selection device 106 may be changed between the first and second states by scanning a specific bar code using the bar code reader. The specific state of other implementations of the mode-selection input device 106 may be changed using appropriate techniques for the particular device employed.

In the computing device 100, the mode-selection input device 106 may be used to select between operating modes of the computing device 100. For instance, when the mode-selection device 106 is in the first state, this may indicate that the computing device 100 is to operate in a first operating mode, (e.g., a secure, user mode, such as is described in further detail below). Likewise, when the mode-selection device 106 is in the second state, this may indicate that the computing device 100 is to operate in a second operating mode, (e.g., a developer mode, such as is also described in further detail below).

As noted above, the mode-selection input device 106 of the computing device 100 may be implemented in a number of fashions. In one example embodiment, the mode-selection input device 106 may be implemented using a public/private key signature pair using a cryptographic algorithm such as a Rivest, Shamir and Adleman (RSA) algorithm. In such an approach, the private half of the key may be stored in a trusted platform module attached to the processor 102, while the public half of the key is stored in the system memory 108. Using this approach, if the private half and public half of the key combine to make a valid digital signature, the developer mode may be selected. If the public/private key pair does not combine to make a valid digital signature, or if the public half of the key pair is not present, the secure, user mode may be selected. In such an embodiment, a user may select the second operation mode (e.g., the developer mode) by executing a utility or program that stores the public half of the key in the system memory 108.

As an alternative to the above public/private key signature pair approach, the public half of the key may be represented by a barcode that is shipped with the computing device 100 (e.g., on a piece of paper that is shipped with the device, or as a sticker placed underneath the battery). Using such an approach, the public half of the key pair may be entered into the computing device 100 using a barcode scanner (e.g., which may be implemented using a camera built into the computing device 100). One benefit of using a barcode that is not attached to the device (e.g., such as on a piece of paper rather than on a sticker attached to the computing device 100) is that the barcode can then be stored separately from the device by the user. Such an arrangement may provide additional security because an attacker must gain access to both the barcode and the device in order to activate the developer mode.

In yet another embodiment, the mode-selection input device 106 may be implemented using an electronic circuit that includes a momentary-contact switch, a latch powered by a battery (or similar discrete logic) which independently retains its state, and a connection to the recovery mode selection device. In such an arrangement, depressing the momentary-contact switch may cause the latch to move from a first state to a second state. The latch circuit may be configured in such a way that it will retain the second state until either the battery is depleted, or the recovery mode selection device is activated. In either of these cases, the latch may transition from the second state to the first state when the recovery mode is initiated. In this way, a user selecting the recovery mode automatically changes the state of the mode-selection device 106 from its second state to its first state.

In another example embodiment, the mode-selection input device 106 may be implemented using a pair of pins onto which a jumper can be placed. In such an approach, when the jumper is not present, the first state (e.g., the secure, user mode) may be selected. Accordingly in this example, when the jumper is placed on the pair of pins, electrically connecting them, the second state (e.g., the developer mode) would be selected.

In still another embodiment, the mode-selection input device 106 may be implemented using a connector to which an external circuit may be attached. Using such an approach, the second state may be selected by attaching the external circuit, while the first state may be selected by removing the external circuit. In such an implementation, the external circuit may be stored in a case of a distinguishing color, and the connector may be located on an obvious part of a case of the computing device 100 (such as above a keyboard of the computing device), so that it is obvious to a user when the external circuit is attached.

In the computing device 100, machine-readable instructions in firmware 104 may be used to check the state of the mode-selection input device 106. Such instructions may be stored, for example, in a write-protected or a non-write protected portion of the firmware 104. Alternatively, the firmware 104 may direct the computing device 100 to execute other machine-readable instructions, such as instructions included in an operating system kernel or a complete operating system, or instructions of a recovery procedure, such as discussed further below, which may be stored in the system memory 108 and/or on the external storage device 120. In the computing device 100, the processor 102 may execute such instructions, at least in part, to determine the state of the mode-selection input device 106. Accordingly, the processor 102 may access instructions for determining the state of the mode-selection input device 106 in the firmware 104, the system memory 108 and/or the external storage device 120. In other embodiments, the processor 102 may access such instructions in other manners, such as over a network connection, for example.

In the computing device 100, when the processor 102 determines (e.g., by executing appropriate machine-readable instructions) that the mode-selection input device 106 is in the first state, this may indicate that the computing device 100 is to operate in a user mode, such as indicated above. In this example, operating in the user mode may provide a high level of user security for typical users of the computing device 100. For instance, when operating in the user mode, the computing device 100 may be configured to only execute machine-readable instructions that are digitally signed by a trusted source, such as machine-readable instructions that are digitally signed by a trusted operating system supplier for the computing device 100, for example.

In order to provide such user security, the computing device 100 may be configured such that, when it is determined that the computing device 100 is to operate in the user mode, the computing device 100 then determines whether machine-readable instructions being executed by the computing device 100 are digitally signed by a trusted source, e.g., a trusted supplier of an operating system of the computing device 100. Such machine-readable instructions may include at least a portion of an operating system, such as an operating system kernel, and/or machine-readable instructions of utilities and/or applications that are running on the computing device 100.

When the computing device 100 is operating in the user mode and the machine-readable instructions are digitally signed by the trusted supplier, the computing device 100, in this particular embodiment, is configured to execute the machine-readable instructions. However, in the situation where the computing device 100 is operating in the user mode and the computing system 100 determines that machine-readable instructions that are not digitally signed by a trusted source have been executed, are being executed or are scheduled to be executed, the computing device 100 may halt operation and provide a warning and/or instructions to a user for restoring the computing device 100 to a known and trusted state (e.g., by running a recovery procedure). Examples of such a recovery procedure are discussed in further detail below. Briefly, however, such a recovery procedure may be executed so as to install machine-readable instructions that are digitally signed by the trusted supplier on the computing device 100. For instance the machine-readable instructions that are not digitally signed by the trusted supplier may be removed and replaced with instructions that are digitally signed by the trusted supplier.

In the computing device 100, when the processor 102 determines (e.g., by executing appropriate machine-readable instructions) that the mode-selection input device 106 is in the second state, this may indicate that the computing device 100 is to operate in a developer mode, such as discussed above. In this example, the developer mode may provide technically-savvy users (hereafter "developers") a high level of accessibility to the elements of the computing device 100. For instance, when operating in the developer mode, the computing device 100 may be configured to load, as well as execute machine-readable instructions that are not digitally signed by a trusted source. This access to the elements of the computing device 100 allows for developers to load their own operating system builds, develop software for use on the computing device 100, as well as enabling a number of other development activities that may not be possible in the user mode, due to the restriction of only running machine-readable instructions that are digitally signed by a trusted source.

However, when operating in the developer mode, the computing device 100 may be more susceptible to malicious acts. For instance, someone may place the computing device 100 in developer mode in order to install malicious software, such as a keystroke logger, for example, where that malicious software may be used to improperly obtain personal information from a user or users of the computing device 100. By using the techniques described herein, the vulnerability of the computing device 100 to such risks, as well as other security risks, may be reduced, and therefore may provide greater security to average users of the computing device 100.

The computing device 100 further includes a recovery mode device 110. The recovery mode device may be an input device, such as a button, that a user may engage in order to direct the computing device 100 to execute a recovery mode procedure. Alternatively, the computing device may initiate execution of such a recovery mode procedure in response to detecting that the computing device 100 is, or is attempting to execute machine-readable instructions, in the user mode, that are not digitally signed by a trusted source.

Depending on the particular arrangement, the recovery mode procedure may be initiated immediately after engagement of the recovery mode device 110 or detection of unsigned instructions. Alternatively, the recovery mode procedure may be initiated during a next boot cycle of the computing device 100. For instance, engagement of the recovery mode device 110 may be recorded in the system memory 108, the firmware 104 or any other appropriate manner, such as by setting a recovery mode flag. The computing device 100 may check the recovery mode flag during its boot sequence and initiate execution of the recovery mode procedure when the recovery mode flag is set. In such arrangements, the recovery mode flag may be cleared when the recovery mode procedure is initiated, so as to prevent the computing device 100 from executing the recovery mode procedure on every boot. In certain embodiments, engagement of the recovery mode device 110 may also result in the mode-selection device being changed from its second state (e.g., developer mode) to its first state (e.g., user mode).

As shown in FIG. 1, the computing device 100 may also include an audio device 112. The audio device 112 may be used to play audio content during normal used of the computing device 100. Additionally, the audio device 112 may be used to play audio prompts and/or audio warnings during certain operations of the computing device 100, in order to provide further security against malicious acts. For instance, if an attempt is made to install malicious software on the computing device 100 when the device has been temporarily left unattended in a public place, such audio prompts and/or warnings may draw undesired attention to a person attempting to install the malicious software. Further, such audio prompts and/or warnings my notify a user of the computing device 100 that their system has been tampered with, which would allow them to take appropriate measures to restore the system to a know and trusted state, thus reducing the risk of personal information being compromised.

Figure 2:
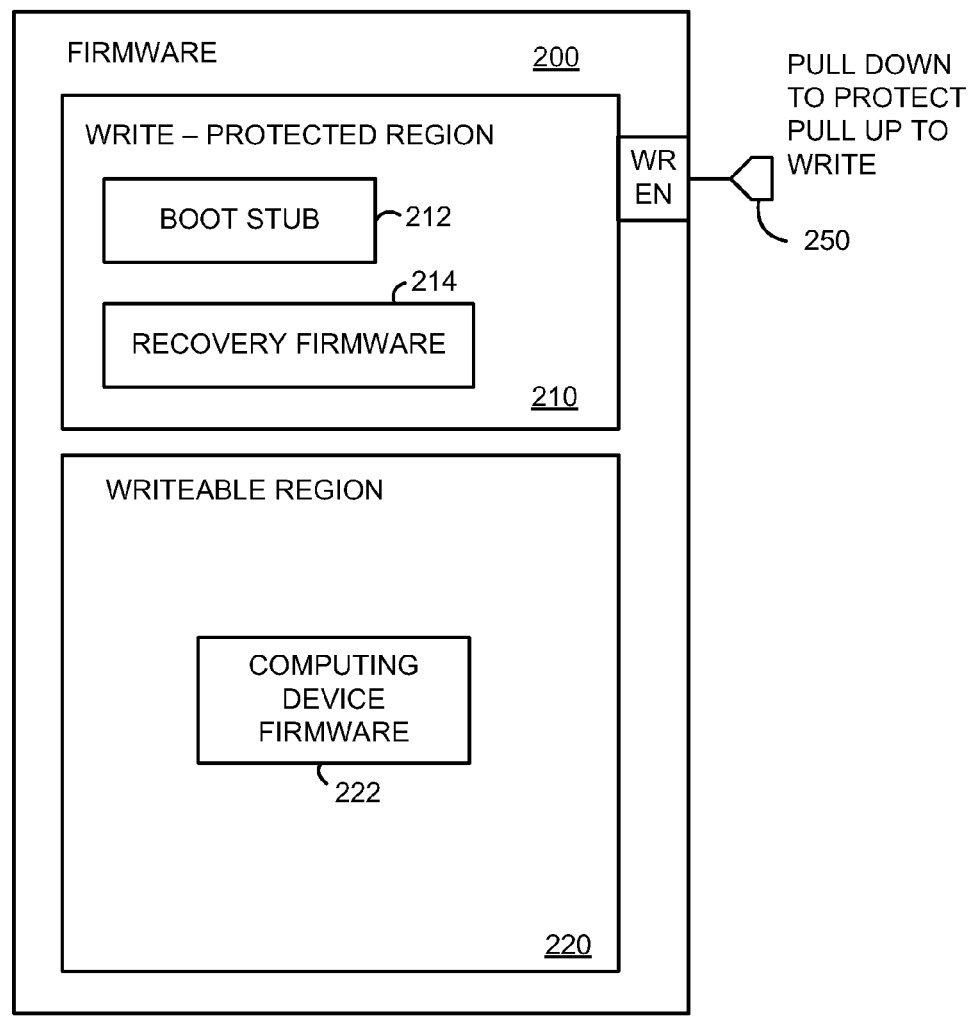
FIG. 2 is a block diagram illustrating firmware in accordance with an example embodiment.

FIG. 2 is a block diagram illustrating firmware 200 in accordance with an example embodiment. The firmware 200 may be implemented as the firmware 104 in the computing system 100, for example. In an example embodiment, the firmware 200 may be implemented in an electrically erasable/programmable read-only memory (EEPROM). As shown in FIG. 2, the firmware 200 includes a write protected region 210 and a writeable region 220.

In the firmware 200, the write-protected region 210 may include a boot stub 212, which initiates a boot process for a computing device in which the firmware is implemented. The write-protected region 210 also includes recovery firmware 214 that may be used to initiate a recovery process for a computing device in which the firmware 200 is implemented, while the writeable region contains computing device firmware 222 which may include machine-readable instructions that implement a portion of the boot process for a computing device.

Including the boot stub 212 and the recovery firmware 214 in the write-protected region 210 of the firmware 200 provides security to a user or users of a computing device because the boot stub 212 and the recovery firmware 214 cannot be easily erased and re-written by an attacker with casual access to such a computing device. Such computing devices may, however, be configured such that a change to the circuitry of the computing device would allow for erasing and rewriting the write-protected portion 210 of the firmware 200. For instance, manufacturers of computing devices may wish to make such a modification to enable efficient development of machine-readable instructions of the boot stub 212 and the recovery firmware 214, as well as any other machine-readable instructions that may be stored in the write-protected portion 210 of the firmware 200.

In an example embodiment, the boot stub 212 may be used by a computing device (e.g., by a processor executing machine-readable instructions included in the boot stub 212) to detect whether the computing device may have been subject to a malicious act. Such detection may include determining that the computing device has had its operating system removed, has had software (machine-readable instructions) installed that are not signed by a trusted supplier, or has been subjected to some other type of malicious act intended to comprise the security of the computing device and/or personal information of a user or users of the computing device. If the boot stub 212 detects that an attack may have occurred, it may then direct a processor to execute the recovery firmware 214 to initiate a recovery procedure to restore the computing device to known, trusted state, such as in the manners described herein.

In order to enable manufacturers to modify the circuitry of a computing device including the firmware 200 to enable erasing and re-writing of the write-protected portion 210, as discussed above, the firmware 200 may also include a write enable pin 250. In the computing device 100, for example, the write enable pin 250 may be pulled down to protect the write-protected region 210 from being overwritten. Depending on the particular embodiment, the write enable pin 250 may be a hardware enable pin, which electrically prevents erasing and programming of the write-protected region 210. In other embodiments, the write enable pin may be read by instructions stored in the firmware to determine whether or not to allow the write-protected region 210 to erased and re-programmed.

In order to provide security to users of the computing system 100, modifying the connection to the write enable pin 250 should require accessing the internal components of the computing system 100, as well as modifying the connection to the write enable pin using, for example soldering equipment. Such an arrangement prevents a person with casual access to the computing system 100, such as at a coffee shop or a conference, from erasing and reprogramming the entire firmware device 200.

In an example embodiment, a boot sequence of a computing device such as the computing device 100 may be initiated by the processor 102 executing instructions included in the boot stub 212. If the computing device 100 is booting in either of a secure, user mode or a developer mode and a recovery mode has not been initiated, the machine-readable instructions of the boot stub 212 may direct the computing device 100 to boot by executing machine-readable instructions of the computing device firmware 222. The machine-readable instructions of the computing device firmware 222 may, in turn, direct the computing device 100 to load/execute operating system instructions included in the system memory 100, such as in the manners described herein.

Alternatively, if the computing device 100 is booting (e.g., in the secure, user mode or the developer mode) and the recovery mode has been initiated, the machine-readable instructions of the boot stub 212 may direct the computing device 100 to boot by executing the machine-readable instructions of the recovery firmware 214. In this situation, the machine-readable instructions of the recovery firmware 214 may, in turn, direct the computing device 100 to execute machine-readable instructions of a recovery procedure (such as in the manners described herein), which may be stored on the external storage device 120.

Figure 3:
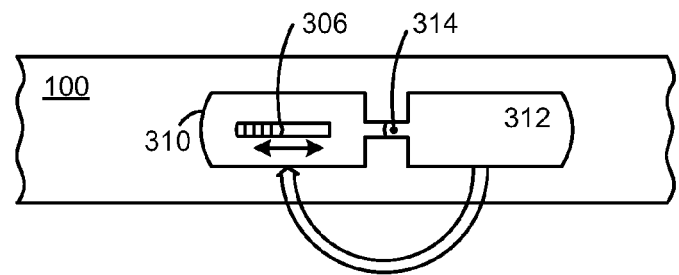
FIG. 3 is a diagram illustrating a mode-selection switch of a computing device in accordance with an example embodiment.

FIG. 3 is a diagram illustrating the computing device 100, where the mode-selection device 106 is implemented as a mode-selection switch 306 in accordance with an example embodiment. As shown in FIG. 3, the mode-selection switch 306 may be located in a recess 310 in the housing of the computing device 110. The mode-selection switch may be physically manipulated to move it from a first position (e.g., corresponding with operating the computing device 100 in a user mode) and a second position (e.g., corresponding with operating the computing device 100 in a developer mode).

The computing device 100 shown in FIG. 3 may also include a cover 312 that when rotated, in the manner illustrated in FIG. 3, covers the recess 310 and the mode selection switch 306. In the embodiment shown in FIG. 3, the cover 312 may be secured in place over the recess 310 and the mode-selection switch 306 using a screw 314. Such an arrangement prevents the switch 306 from being inadvertently moved between its two positions. After remove the screw 314, the cover could be rotated, such as shown in FIG. 3, hinged, or removed, so as to allow access to the mode-selection switch 306.

Such an arrangement, as shown in FIG. 3, may also be a deterrent to malicious acts, such as the installation of malicious software (malware). For instance, because the cover 314 is removed in order to access the switch 306 (i.e., to change operation modes of the computing device 100), if the computing device 100 has been left unattended in a public place, the process of a person removing the cover 314 may draw unwanted attention, thus deterring or preventing such a malicious act.

Figure 4:
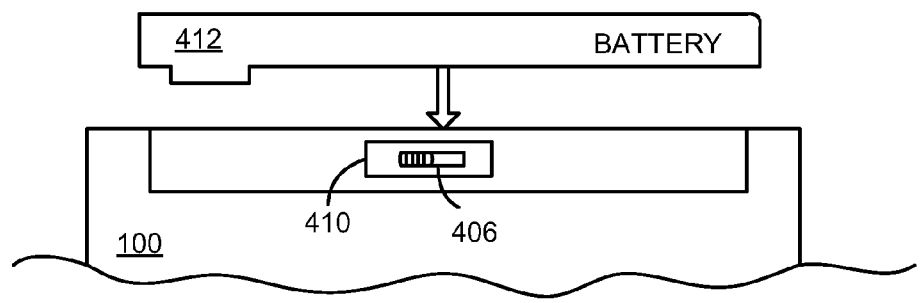
FIG. 4 is a diagram illustrating a mode-selection switch of a computing device in accordance with an example embodiment.

FIG. 4 is a diagram illustrating the computing device 100, where the mode-selection device 106 is implemented as a mode-selection switch 406 in accordance with an example embodiment. As with the mode-selection switch 306, the mode selection switch 406 may be physically manipulated to move it from a first position (e.g., corresponding with operating the computing device 100 in a user mode) and a second position (e.g., corresponding with operating the computing device 100 in a developer mode). As shown in FIG. 4, the mode-selection switch 406 may be located in a recess 410 in the housing of the computing device 110, such that the recess 410 and the switch 406 are located under a battery 412 of the computing device 100 when the battery is in place on the computing device 100.

In like fashion as with the cover 312 shown in FIG. 3, having the mode-selection switch 406 under the battery 412 when the battery is in place prevents the switch 406 from inadvertently being moved between its two positions. Such an arrangement is also a deterrent to malicious acts, such as the installation of malware. For instance, because the battery 412 would be removed in order to access the switch 406 (i.e., to change operation modes of the computing device 100), if the computing device 100 has been left unattended in a public place, the process of a person removing the battery 412 in order to access the mode-selection switch 406 may draw unwanted attention, thus deterring or preventing such a malicious act.

Figure 5:
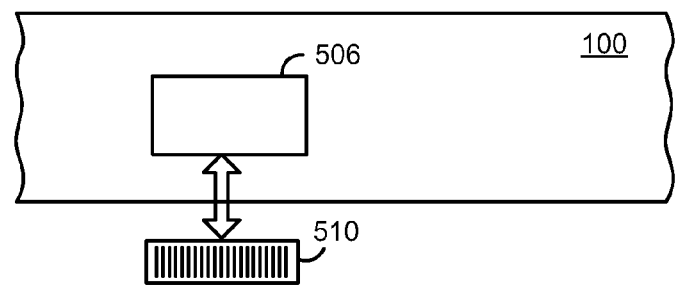
FIG. 5 is a diagram illustrating a mode-selection input device of a computing device in accordance with an example embodiment.

FIG. 5 is a diagram illustrating the computing device 100, where the mode-selection device 106 is implemented as a barcode reader 506 in accordance with an example embodiment. In the embodiment illustrated in FIG. 5, the computing device 100 may be switched between a user mode and a developer mode, such as the operation modes described herein, by using the barcode reader 506 to read a specific barcode 510. In such an arrangement, the computing device 100 would recognize the barcode 510 as a mode-selection barcode. Such an arrangement prevents inadvertently changing operation modes, as the barcode 510 must be placed in proximity to the barcode reader 506 in order to change operation modes. Such an arrangement may also prevent malicious acts, such as the installation of malware, as a person attempting to change operation modes of the computing device 110 would need the barcode 510 in order to change modes.

Figure 6:
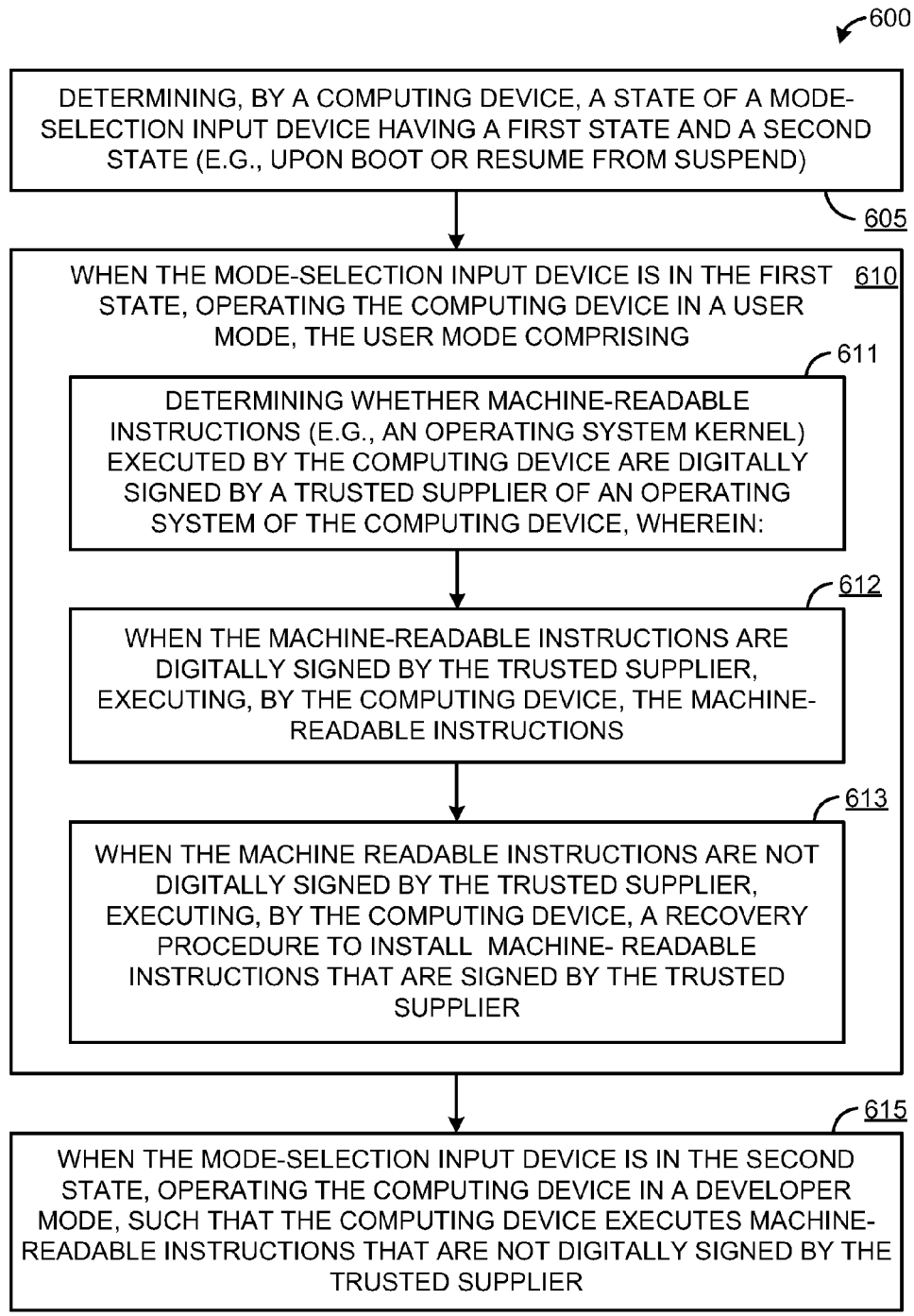
FIG. 6 is a flowchart illustrating a method for operating a computing device in accordance with an example embodiment.

FIG. 6 is a flowchart of a method 600 for operating a computing device in accordance with an example embodiment. The method 600 may be implemented, for example, in the computing device 100. Alternatively, the method 600 may be implemented using other devices.

The method 600, at block 605, includes determining, by a computing device, a state of a mode-selection input device. For example, the position of a mode-selection switch may be determined at block 605. In one embodiment, the state of the mode-selection input device may be determined as part of a boot sequence. In such an approach, instructions stored in firmware may be used to determine the state of the mode-selection input device.

In another embodiment, the state of the mode-selection input device may be determined as part of resuming operation of a computing device from a suspend mode. In such an arrangement, instructions stored in system memory of the computing device may be used to determine the state of the mode-selection input device. Such instructions may, for example, be part of an operating system kernel. In yet other embodiments, the state of the mode-selection input device may be determined on a periodic basis. In such an arrangement, instructions stored in system memory of the computing device may be used to determine the state of the mode-selection input device.

If it is determined at block 605 that the mode-selection input device is in a first state, indicating that the device should operate in a user mode, such as in the fashions described herein, the method 600 includes performing the operations included at block 610. If it is determined at block 605 that the mode-selection input device is in a second state, indicating the computing device should operate in a developer mode, such as in the fashions described herein, the method 600 includes performing the operation included at block 615.

If the device is operating in the user mode, the method 600 includes, at block 611, determining whether machine-readable instructions executed by, or to be executed by the computing device are digitally signed by a trusted supplier, such as a trusted supplier of an operating system of the computing device. Such a determination may be made using corresponding private/public keys that are included in firmware (e.g., the boot stub) and with the signed machine-readable instructions. The computing device may determine, at block 611, whether, for example, at least a portion of an operating system kernel is digitally signed by the trusted supplier. If it is determined, at block 611, that the machine-readable instructions are digitally signed by the trusted supplier, the method 600 includes, at block 612, executing, by the computing device, the signed machine-readable instructions.

If, however, it is determined, at block 611, that the machine-readable instructions are not digitally signed by the trusted supplier, the method 600 includes, at block 613, executing, by the computing device, a recovery procedure to install machine-readable instructions that are digitally signed by the trusted supplier on the computing device. For instance, the recovery procedure may include removing an operating image that is installed on the computing device and replacing the removed image with a known and trusted operating image. Such an approach is illustrated in FIG. 7 and described in further detail below.

If the computing device is operating in the developer mode, the method 600 includes, at block 615, operating the computing device such that it executes machine-readable instructions that are not digitally signed by the trusted supplier. Such an approach allows developers to run their own operating systems, develop software for use on the computing device, as well as perform a number of operations that may not be permissible when operating in the secure, user mode.

Figure 7:
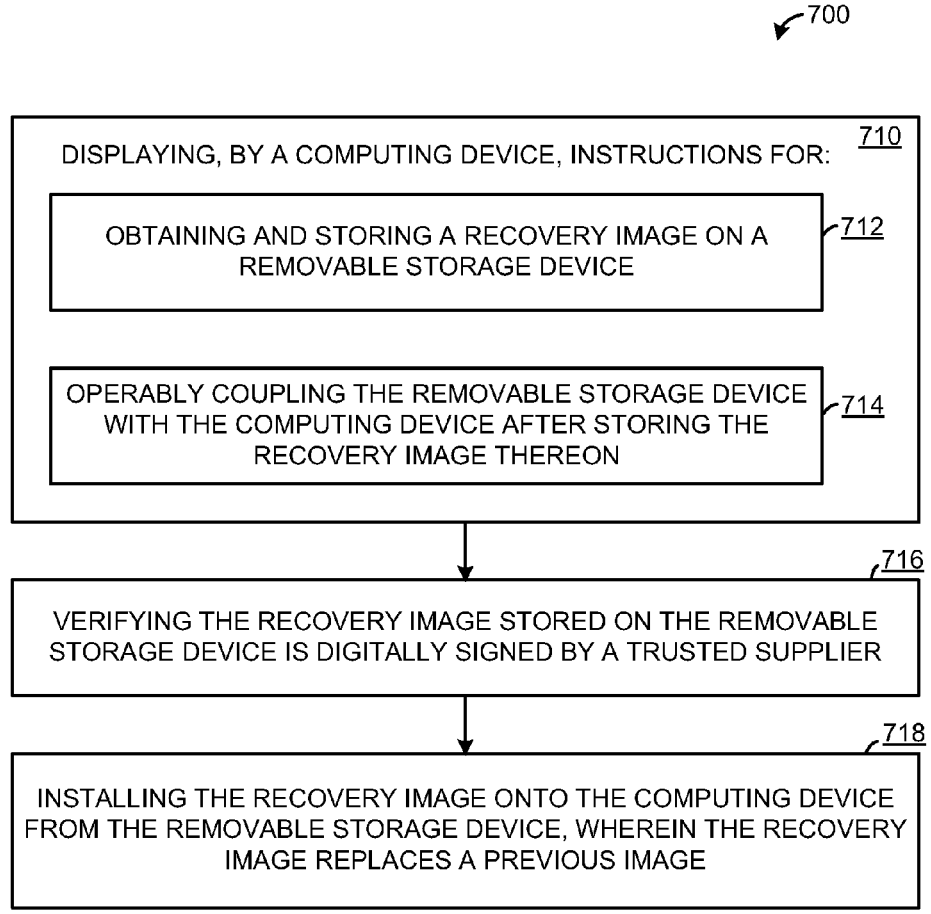
FIG. 7 is a flowchart illustrating a method for executing a recovery procedure for a computing device in accordance with an example embodiment.

FIG. 7 is a flowchart illustrating a method 700 for executing a recovery procedure for a computing device in accordance with an example embodiment, such as discussed above with respect to the computing device 100. While the method 700 is directed to obtaining and installing a recovery image on a computing device, such a recovery procedure may be used, generally, to install machine-readable instructions that are digitally signed by a trusted supplied on a computing device, such as the computing device 100, for example.

The recovery procedure of the method 700 may be implemented using machine-readable instructions that are included in firmware of a computing device and/or on a removable storage device that is operationally coupled with the computing device. The recovery procedure illustrated in FIG. 7 may be executed by the computing device 100 when the computing device 100 is operating in a secure, user mode, such as is described herein. Execution of the method 700 may be initiated by a user engaging a recovery mode device or as a result of the computing device executing or attempting to execute machine-readable instructions that are not digitally signed by a trusted supplier, such as was previously described.

The method 700 includes, at block 710 displaying instructions to a user of a computing device, such as by using a computer display of a computing device that is executing the recovery procedure of the method 700. These instructions may include, at block 712, instructions for obtaining and storing a recovery image on a removable storage device. The instructions displayed at block 712 may include, for example, instructions for using another computing device to access a website where the recovery image for the computing device running the recovery procedure may be obtained and then stored on the removable storage device.

For instance, such a website may include a data entry field for entering a code identifying a specific model of a computing device that is executing the recovery procedure, such as model number or other identifying code. Based on the entered code, the trusted supplier, for example, may identify a corresponding recovery image. The recovery image may include, for example, recovery software, firmware information for a writeable portion of a firmware device and operating system information to be stored in system memory of the computing device executing the recovery procedure. The recovery procedure instructions may further include, at block 714, instructions for operably coupling the removable storage device with the computing device executing the recovery procedure after the recovery image has been stored on the removable storage device.

The method 700 further includes, at block 716, verifying that the recovery image stored on the removable storage device is digitally signed by the trusted supplier. At block 718, the method 700 still further includes installing, from the removable storage device, the recovery image onto the computing device that is executing the recovery procedure, where the recovery image replaces a previous image.

FIG. 8 is a diagram illustrating the computing device 100, where the computing device 100 includes a display device. As shown in FIG. 8, the display device of the computing device 100 may be used to display recovery procedure instructions 810 to a user. For example, the recovery procedure instruction 810 may include the instructions discussed above with respect to blocks 712 and 714 of the method 700. In other embodiments, the recovery procedure instructions 810 may include other appropriate instructions for a particular recovery procedure being executed by the computing device 100.

Figure 9:
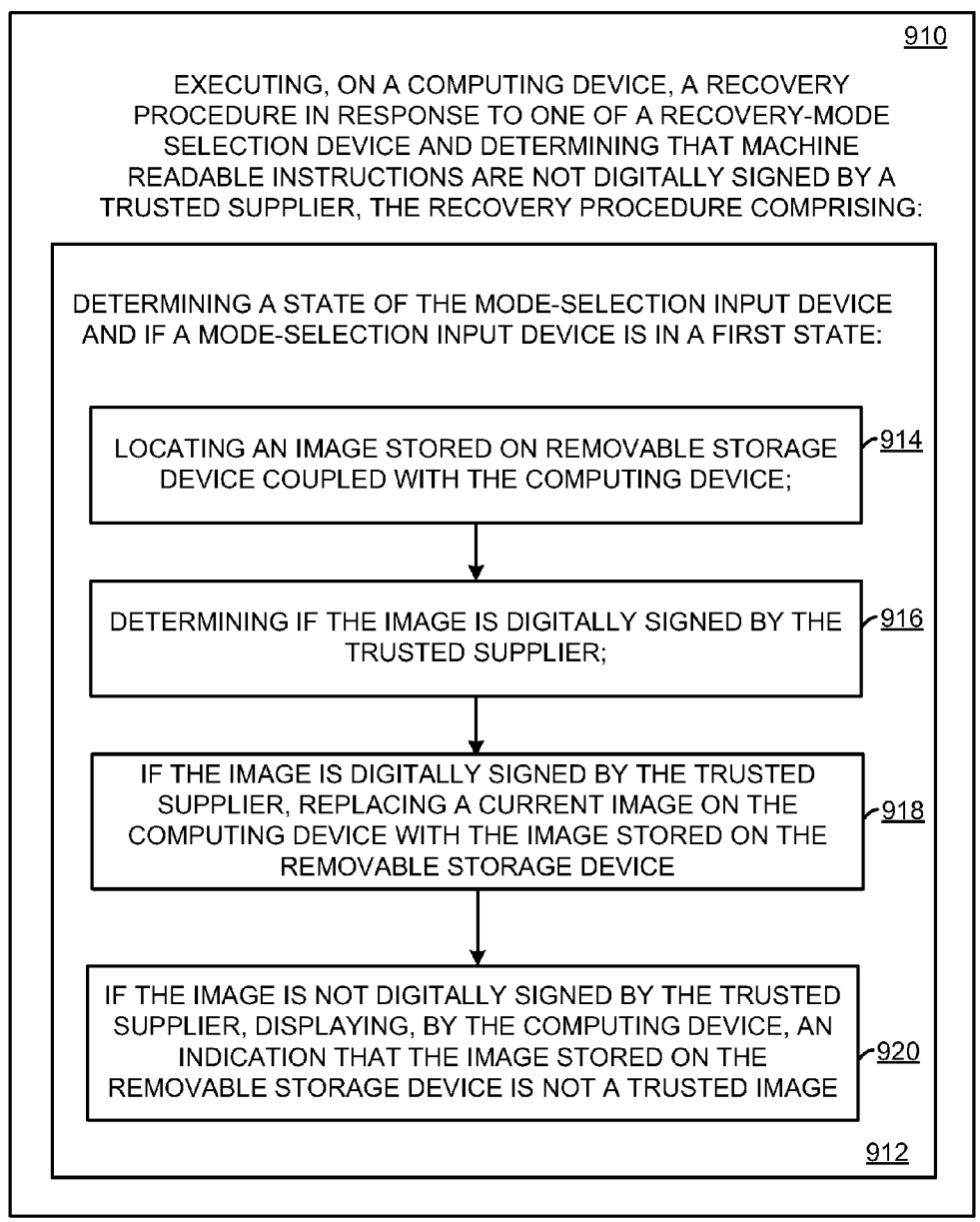
FIG. 9 is a flowchart illustrating a method for executing a recovery procedure for a computing device in accordance with an example embodiment.

FIG. 9 is a flowchart illustrating a method 900 for executing a recovery procedure for a computing device in accordance with an example embodiment. While the method 900 is directed to installing a recovery image on a computing device, such a recovery procedure may be used, generally, to install machine-readable instructions that are digitally signed by a trusted supplier on a computing device, such as on the computing device 100, for example.

The recovery procedure of the method 900 may be implemented using machine-readable instructions that are included in firmware of a computing device and/or on a removable storage device that is operationally coupled with the computing device. The computing device 100 may execute the recovery procedure illustrated in FIG. 9 when the computing device 100 is operating in a secure, user mode, such as described herein.

Execution of the method 900, as indicated at block 910, may be initiated by a user engaging a recovery mode device, or as a result of the computing device executing or attempting to execute machine-readable instructions that are not digitally signed by a trusted supplier, such as was previously described. In similar fashion as previously described, the recovery procedure of the method 900 may be executed at a next boot cycle after the recovery mode device is engaged or unsigned machine-readable instructions are detected. Alternatively, the method 900 may be executed as a direct result of the recovery mode device being engaged or unsigned machine-readable instructions being detected. In other embodiments, the recovery mode may be initiated if the computing device discovers (e.g., using firmware instructions) that operating system instructions for the computing device are not present in the computing device's system memory, or otherwise stored in the computing device. Such a situation may occur if, for example, an attacker were to delete the operating system from the computing device. Such an approach may be implemented using firmware that include a boot stub and recovery firmware that are stored in a write-protected portion of a firmware devices, such as discussed above.

At block 912, the method 900 includes determining a state of a mode-selection input device and if the mode-selection is in a first state (indicating that the computing device is operating in a user mode, such as described herein), the method 900 may then include execution of the operations shown in blocks 914, 916, 918 and 920. At block 920, the method 900 includes locating an image stored on a removable storage device that is coupled with the computing device. At block 916, the method includes determining whether the image stored on the removable storage device is digitally signed by a trusted supplier. This determination may be made using, for example, corresponding public/private keys.

If the image stored on the removable storage device is digitally signed by the trusted supplier, the method 900 includes, at block 918, replacing a current image on the computing device with the image stored on the removable storage device. If, however, the image stored on the removable storage device is not digitally signed by the trusted supper, the method 900 includes, at block 920, displaying, by the computing device, an indication that the image stored on the removable storage device is not a trusted image. Such an approach may prevent malicious acts, such as installation of malware, because the operating mode of the computing device would need to be changed in order to install machine-readable instructions that are not signed by a trusted supplier. Using the techniques for implementing a mode-selection input device that are described herein, such malicious acts may be prevented due to the actions taken to change the operation mode of such a computing device.

FIG. 10 is a diagram illustrating the computing device 100, where the computing device 100 includes a display device, in similar fashion the display device shown in FIG. 8. As shown in FIG. 10, the display device of the computing device 100 may be used to display an indication/warning to a user of the computing device 100 that machine-readable instructions stored on the removable storage device are not digitally signed by the trusted supplier, such as in block 920 of the method 900. In such a situation, the image and/or the machine-readable instructions that are stored on the removable storage device would not be installed on the computing device 100, thus protecting the security of a user or users of the computing device 100.

Figure 11:
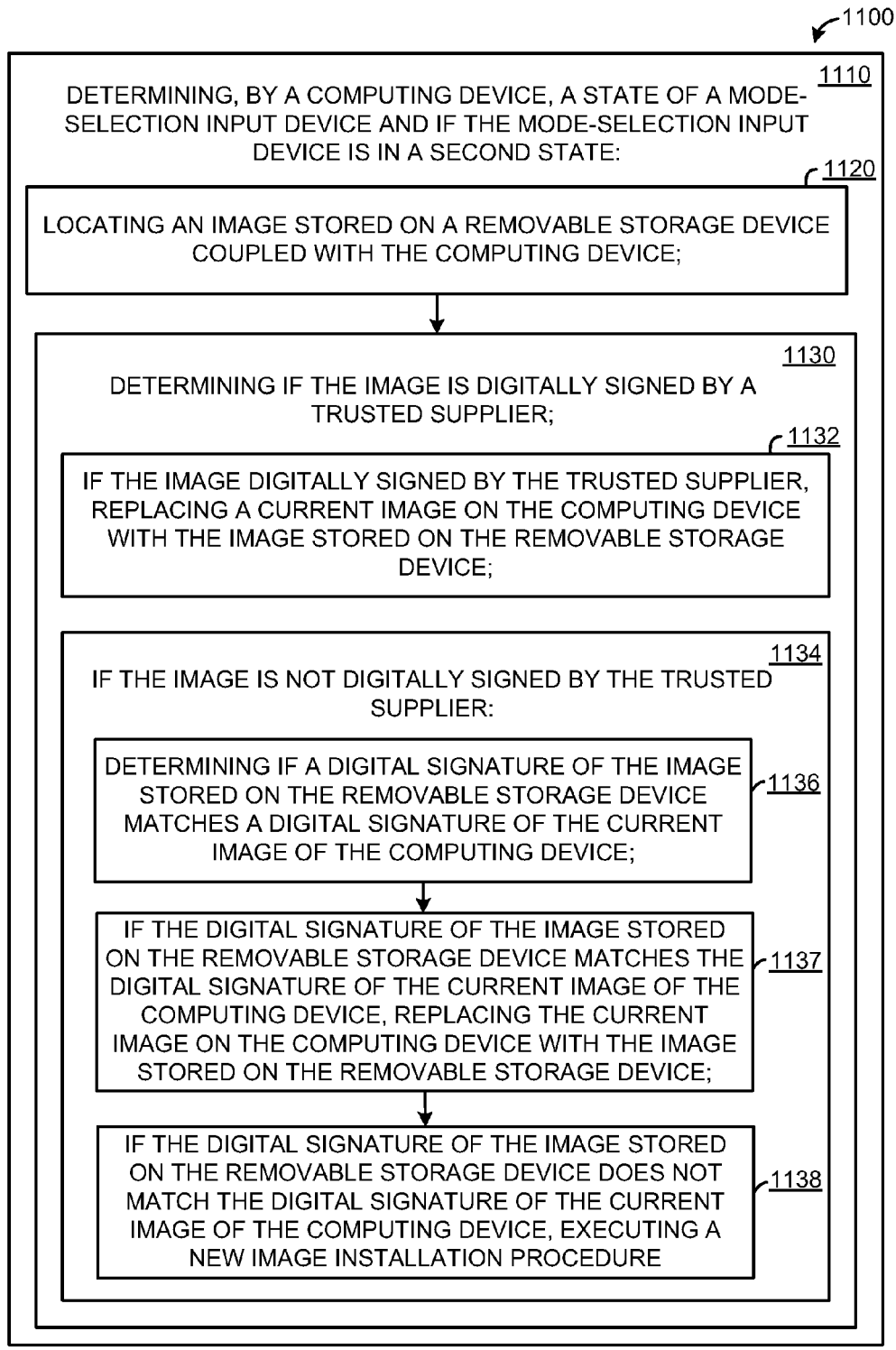
FIG. 11 is a flowchart illustrating a method of operating a computing device in a developer mode in accordance with an example embodiment.

FIG. 11 is a flowchart illustrating a method 1100 for executing a recovery procedure for a computing device in accordance with an example embodiment. While the method 1100 is directed to installing an image on a computing device that is operating in a developer mode, such a recovery procedure may be used, generally, to install machine-readable instructions that may or may not be digitally signed by a trusted supplier on a computing device, such as on the computing device 100, for example.

The recovery procedure of the method 1100 may be implemented using machine-readable instructions that are included in firmware of a computing device and/or on a removable storage device that is operationally coupled with the computing device. The computing device 100 may execute the recovery procedure illustrated in FIG. 11 when the computing device 100 is operating in a developer mode, such as described herein, and as indicated at block 1110 (e.g., that a mode-selection input device was determined to be in a second state, such as corresponding with the computing device operating in a developer mode).

Execution of the method 1100 may be initiated by a user placing a computing device, such as the computing device 100, in a developer mode and then engaging a recovery mode device, such as the recovery mode device 110. The recovery procedure of the method 1100 may be executed at a next boot cycle after the recovery mode device is engaged. Alternatively, the method 1100 may be executed as a direct result of the recovery mode device being engaged.

The recovery procedure of the method 1100 includes, at block 1120, locating an image stored on a removable storage device that is coupled with the computing device. At block 1130, the method 1100 includes, determining if the located image is digitally signed by the trusted supplier. If the located image is digitally signed by the trusted supplier, the method 1100 includes, at block 1132, replacing a current image on the computing device with the image stored on the removable storage device, such as in similar fashion as discussed above.

As shown in FIG. 11, if the image located on the removable storage device is not digitally signed by the trusted supplier, the method 1100 may include the operations of block 1134. For instance, at block 1136, the method 1100 includes determining if a digital signature of the image stored on the removable storage device matches a digital signature of the current image of the computing device. When the digital signature of the image stored on the removable storage device matches the digital signature of the current image of the computing device, the method 1100 includes, at block 1137, replacing the current image on the computing device with the image stored on the removable storage device.

In this situation, a developer may self sign (digitally sign) machine-readable instructions that he or she wished to install on the computing device. Therefore, the digital signatures matching at block 1137 indicates that the image stored on the removable storage device was very likely produced by the same developer that produced the currently installed image of the computing device. Therefore, in these circumstances, the risk that the new image is being installed as a malicious act is likely very low. Accordingly, replacement of the current image of the computing device with the image stored on the removable storage device, at block 1137 of the method 1100, may be done without introduction of any interactive steps or added delay. Such an approach allows developers to quickly install new images that are produced using the same digital signature after an initial image signed with the developer's digital signature has been installed to the computing device.

Figure 12:
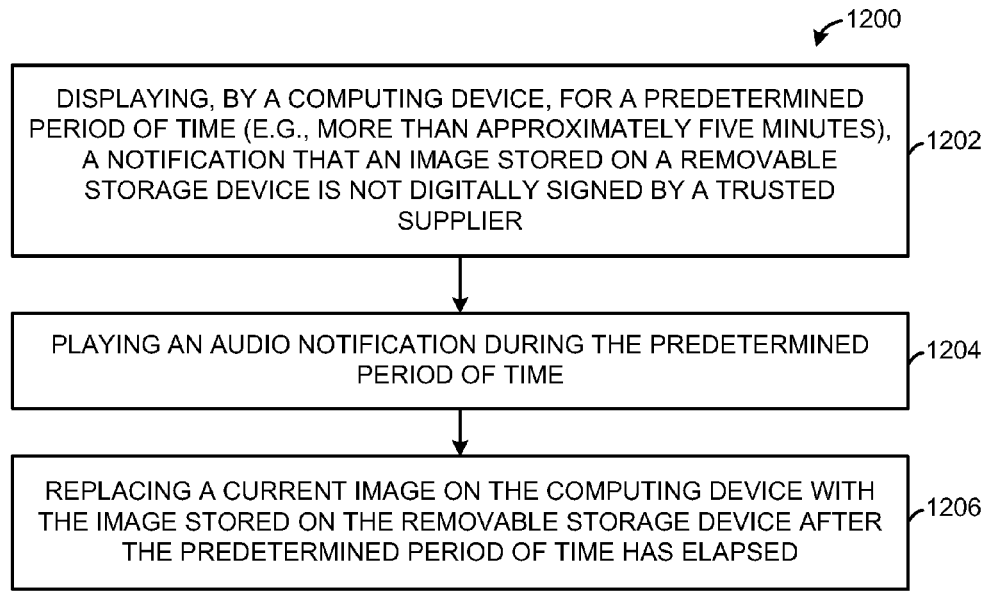
FIG. 12 is a flowchart illustrating a new image installation procedure for a computing device in accordance with an example embodiment.

At block 1138, when the digital signature of the image stored on the removable storage device does not match the digital signature of the current image of the computing device, the method 1100 includes executing a new image installation procedure. An example new image installation procedure is illustrated in FIG. 12 and discussed below. Briefly, a new image installation procedure may be used to prevent a malicious image, such as an image that logs personal information, from being easily installed by someone with casual access to a computing device, such as in a public place (e.g., a coffee shop or a conference).

FIG. 12 is a flowchart illustrating a method 1200 for a new image installation procedure in accordance with an example embodiment. As indicated above, the new image installation procedure of the method 1200 may be used when installing an image and/or machine-readable instructions that are either not digitally signed or are digitally signed using a digital signature that is different than a digital signature that was used to sign a currently installed image and/or currently installed machine-readable instructions on a computing device on which the method 1200 is being executed.

The method 1200, at block 1202, includes displaying, for a predetermined period of time, a notification that the image stored on a removable storage device coupled with the computing device is not digitally signed by a trusted supplier. In an example embodiment, the predetermined period of time may be more than approximately five minutes. Such a delay is on the order of the amount of time it would take someone with complete physical access to a computing device (e.g., in a private setting) to make a hardware modification that would allow for easy installation of malware, such as by allowing a write-protected region of a firmware device to be erased and reprogrammed.

Accordingly, implementing a delay of more than approximately five minutes at block 1202 of the method 1200 results in a first installation of a self signed image, a first installation of self-signed machine readable instructions and/or installation of unsigned machine-readable instructions taking approximately the same amount of time as making such a hardware modification. Accordingly, using such a new image installation procedure, where there is only casual access to a computing device, such as in a in a public place, provides a deterrent to easy installation of malware.

In order to further increase the security of a computing device, the method 1200 may further include, at block 1204, playing an audio notification during the predetermined period of delay of block 1202. The audio prompt may simply indicate that non-trusted code is being installed to the computing device. Alternatively, the audio notification could simply be a repetitive alert, in order to draw attention if an attempt is being made to install malware to a computing device in a public place. Depending on the particular embodiment, the audio notification may be played during the entire delay at block 1202, or may only be played for a portion of that delay. The method 1200 may further include, at block 1206, replacing a currently installed image of the computing device with the image that is stored on the removable storage device, after the predetermined period of time has elapsed. In order to further increase the security of a computing device, the method 1200 may also include requesting that the user to supply input at one or more times during the delay. Such user input may be provided using, for example, via a keyboard or a pointing device. This increases the risk that the attacker will be discovered during an attempt comprise the computing device, since the attacker must be present during the entire delay and cannot simply leave and return after the delay has elapsed.

Figure 13:
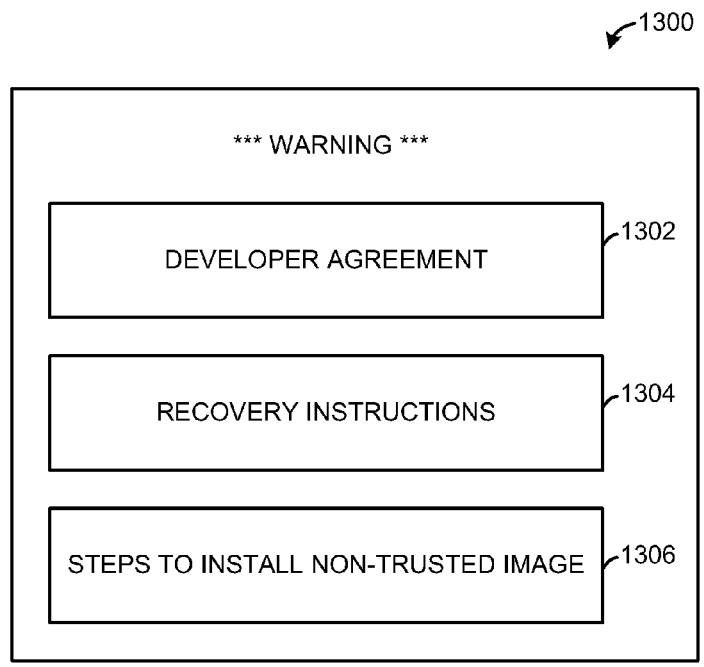
FIG. 13 is diagram illustrating a display of a computing device in accordance with an example embodiment that may be use in conjunction with the method illustrated in FIG. 12.

FIG. 13 is a diagram illustrating a display 1300 that may be used at block 1202 of the method 1200. The display 1300 may be displayed on a computing device that is executing the new image installation procedure of the method 1200. The display 1300 may include a warning that an image and/or machine readable instructions that are not signed by the trusted supplier are being installed to the computing device, such as, for example, in a developer agreement 1302.

The display 1300, e.g., the developer agreement 1302 may also request that a user agree to the terms of the developer agreement 1302 before the installation proceeds. Alternatively, such agreement may be requested at some point during the delay at block 1202, such as after pausing and before resuming a timer that is used to track the delay. Such an approach assures that non-malicious developers consent to the terms of the agreement. This approach also provides added security as it prevents someone from inserting a removable storage device into a computing device, starting recovery mode and then walking away during the new image installation procedure, only to return to remove the removable storage device after malware has been installed.

The display 1300 may also include recovery instructions 1304, which may be the same, or similar to the instructions discussed above with respect to block 710 of the method 700. The instructions 1304 may further include instructions for changing the operation mode of a computing device from a developer mode to a user mode, such as discussed herein, so as to return the computing device to a secure, user mode. The display 1300 may also include instructions 1306 that may list additional interactive steps for installing an image or machine-readable instructions that are not signed by a trusted supplier.

Figure 14:
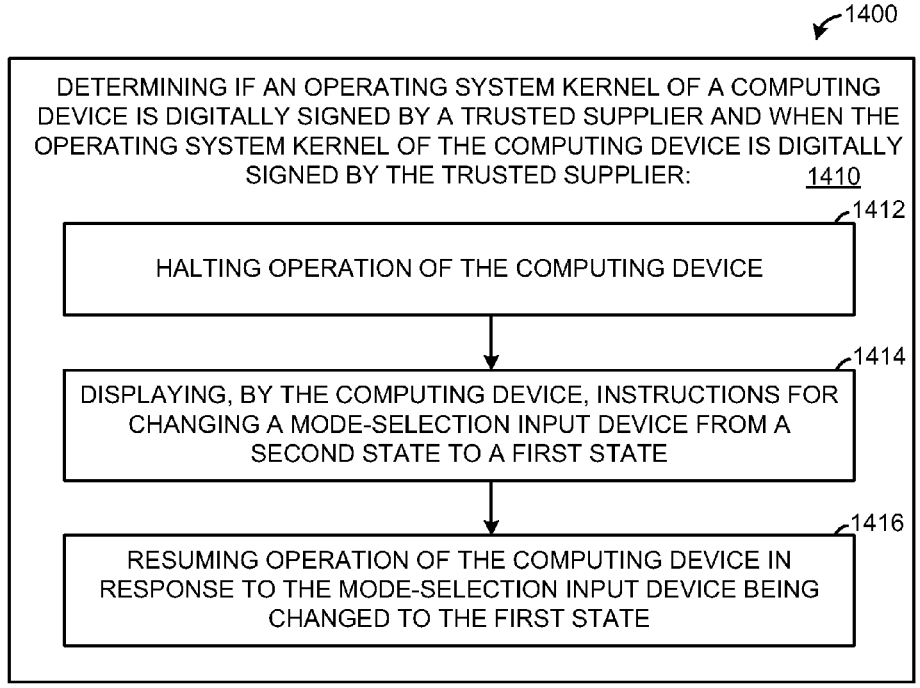
FIG. 14 is a flowchart illustrating a method of changing operating modes of a computing device in accordance with an example embodiment.

FIG. 14 is a flowchart illustrating a method 1400 of changing operating modes of a computing device in accordance with an example embodiment. The method 1400 may be implemented by a computing device, such as the computing device 100, that is initially operating in a developer mode, such as described herein. The method 1400 includes, at block 1410, determining that an operating system kernel installed on the computing device is signed by a trusted supplier.

When the operating system kernel of the computing device is digitally signed by the trusted supplier, the method 1400 may then include the operations of blocks 1412, 1414 and 1416. The method 1400, at block 1402, includes halting operation of the computing device. At block 1404, the method 1400 includes displaying, by the computing device, instructions for changing a mode-selection input device from a second state (corresponding with the developer mode) to the first state (corresponding with a secure, user mode). The method 1400 further includes, at block 1416, resuming operation of the computing device in response to the mode-selection input device being changed to the first state, or the computing device being placed in the secure, user mode.

The method of 1400 may provide additional security for average users (non-developers) of such computing devices. For instance, because, in the described situation, the operating system kernel of the computing device is signed by the trusted supplier, operating the computing device in developer mode may leave the computing device vulnerable to attack. For instance, because machine-readable instructions that are not signed by the trusted supplier may be installed, such as in accordance with the method 1200, without accessing the mode-selection input device of such a computing system, the computing device may be less secure than when operating in a secure, user mode.

Furthermore, in certain embodiments, operating the computing device in developer mode disables automatic updates, such as for the operating system. Because such updates often address security vulnerabilities, operating the computing device in developer mode may result in the computing device being more vulnerable to such attacks.

Figure 15:
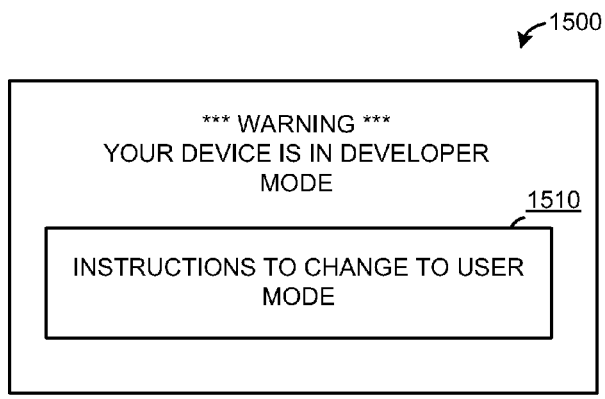
FIG. 15 is diagram illustrating a display of a computing device in accordance with an example embodiment that may be use in conjunction with the method illustrated in FIG. 14.

FIG. 15 is a diagram illustrating a display 1500 that may be used at block 1414 of the method 1400. The display 1500 may be displayed on a computing device that is executing the method 1500. The display 1500 may include, for example, instructions 1510 for changing the state of a mode-selection device from a second state corresponding with a developer mode to a first state corresponding with a secure, user mode, such as in accordance with the techniques described herein.

Figure 16:
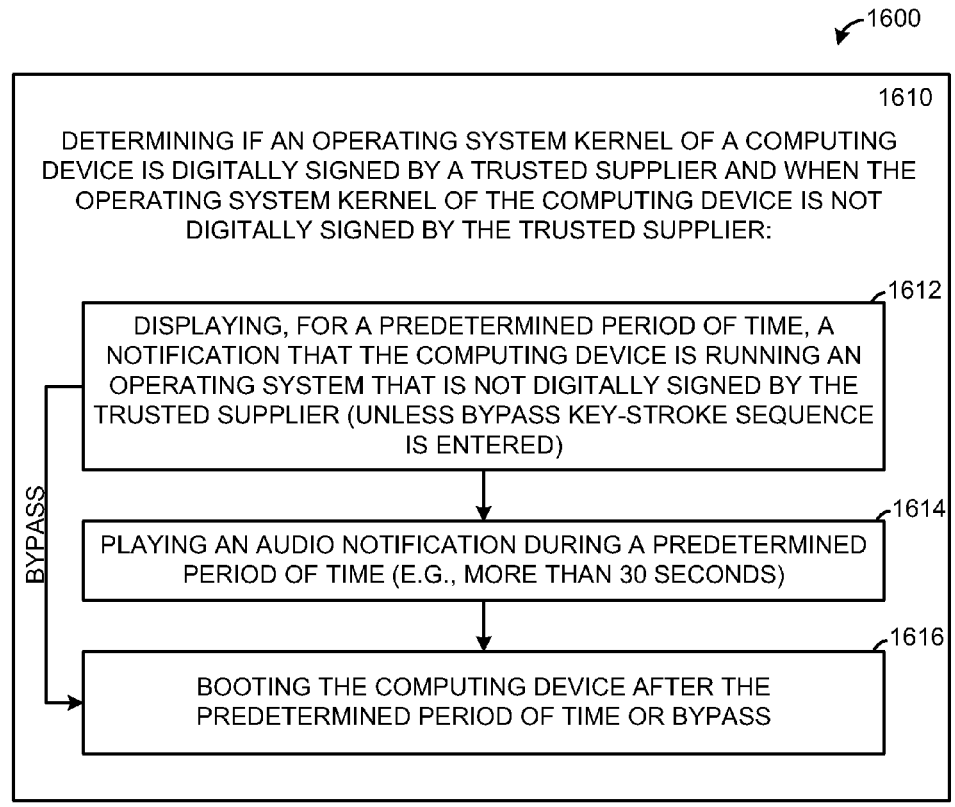
FIG. 16 is a flowchart illustrating a method of operating a computing device in a developer mode in accordance with an example embodiment.

FIG. 16 is a flowchart illustrating a method 1600 of operating a computing device in a developer mode in accordance with an example embodiment. The method 1600 may be implemented by a computing device, such as the computing device 100, after installation of a self-signed developer image and when the computing device is operating in a developer mode, such as described herein. The method 1600, at block 1610, includes determining that an operating system kernel of the computing device is not digitally signed by the trusted supplier.

The method 1600 also includes, at block 1612, displaying, for a predetermined period of time (e.g., more than approximately 30 seconds), a notification that the computing device is running an operating system that is not digitally signed by the trusted supplier. In the method 1600, this notification may be bypassed, e.g., by a developer, using a specific bypass key sequence.

In an example embodiment, the notification displayed at block 1612 may be bypassed by entering Ctrl-d on a keyboard of the computing device. Of course, other bypass keystroke sequences may be used. In this situation, the method 1600 may skip block 1614 and proceed directly to block 1616. If, however, the bypass keystroke sequence is not entered, the method 1600 may include, at block 1614, playing an audio notification, such as single beep, during the predetermined period of time of block 1612. This audio notification may serve to attract the attention of a user of the computing device so that the user will observe the notification displayed at block 1612 and take steps to run a recovery procedure on the computing device, such as the recovery procedure discussed above with respect to FIG. 7, for example. The method of 1600, further includes at block 1616, booting the computing device after the predetermined time has elapsed, or after the bypass keystroke sequence is entered.

The method of claim 16 allows for a computing device, such as the computing device 100, when operating in a developer mode, to execute machine-readable instructions that are not signed by a trusted supplier (e.g., instructions that are included in a developer's self signed operating image). The method 1600 provides for such operation regardless of whether the computing device is attended or not attended. For instance, in the case where the computing device is attended, a bypass sequence may be entered at block 1612 to bypass the predetermined time delay of block 1612 and the audio notification of block 1614. If the computing device is not attended, such as may be case for a media server, for example, the method 1600 allows for the a computing device operating in the developer to boot after the predetermined time delay of block 1612, e.g., approximately 30 seconds.

Figure 17:
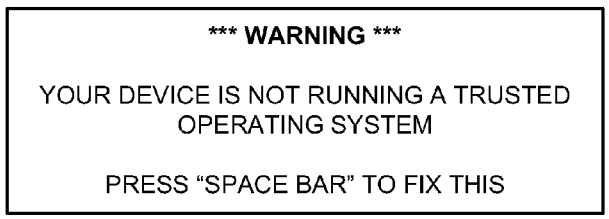
FIG. 17 is diagram illustrating a display of a computing device in accordance with an example embodiment that may be use in conjunction with the method illustrated in FIG. 16.

FIG. 17 is a diagram illustrating a display 1700 that may be used at block 1612 of the method 1600. The display 1700 may be displayed on a computing device that is executing the method 1600. As shown in FIG. 17, the display 1700 may indicate that the computing device is not running an operating system that was digitally signed by a trusted supplier. The display 1700 may also instruct the user to press a key, such as the spacebar, to initiate execution of a recovery procedure, such as using the techniques described herein. In an example embodiment, a user pressing any key other than a specific bypass keystroke sequence may be used initiate a recovery procedure.

Figure 18:
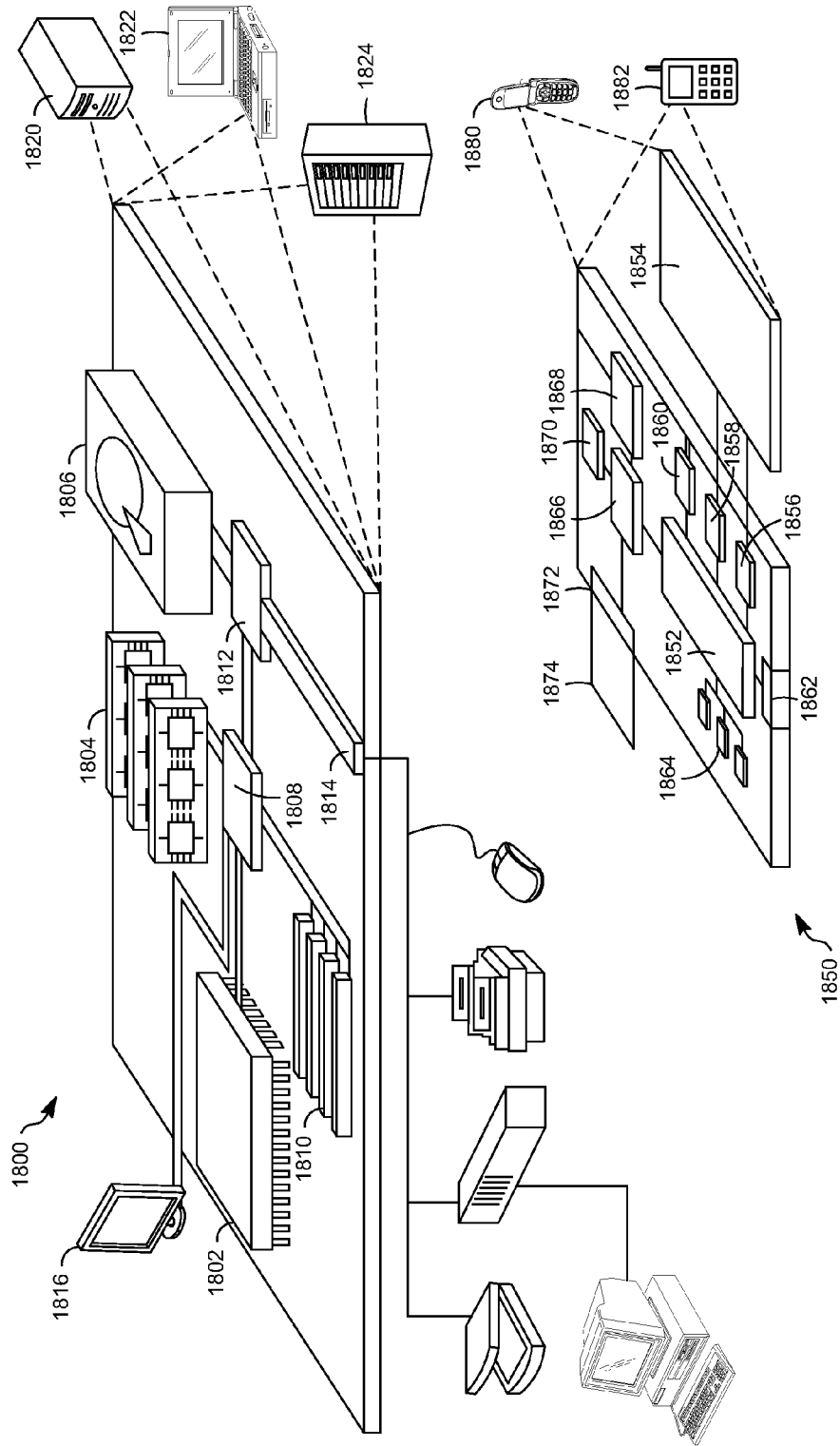
FIG. 18 shows an example of a computer device and a mobile computer device that can be used to implement the techniques described here.

FIG. 18 shows an example of a generic computer device 1800 and a generic mobile computer device 1850, which may be used with the techniques described here. Computing device 1800 is intended to represent various forms of digital computers, such as laptops, desktops, workstations, personal digital assistants, servers, blade servers, mainframes, and other appropriate computers. Computing device 1850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1800 includes a processor 1802, memory 1804, a storage device 1806, a high-speed interface 1808 connecting to memory 1804 and high-speed expansion ports 1810, and a low speed interface 1812 connecting to low speed bus 1814 and storage device 1806. Each of the components 1802, 1804, 1806, 1808, 1810, and 1812, are interconnected using various busses, and may be mounted on a common motherboard or in other manners as appropriate. The processor 1802 can process instructions for execution within the computing device 1800, including instructions stored in the memory 1804 or on the storage device 1806 to display graphical information for a GUI on an external input/output device, such as display 1816 coupled to high speed interface 1808. In other implementations, multiple processors and/or multiple buses may be used, as appropriate, along with multiple memories and types of memory. Also, multiple computing devices 1800 may be connected, with each device providing portions of the necessary operations (e.g., as a server bank, a group of blade servers, or a multi-processor system).

The memory 1804 stores information within the computing device 1800. In one implementation, the memory 1804 is a volatile memory unit or units. In another implementation, the memory 1804 is a non-volatile memory unit or units. The memory 1804 may also be another form of computer-readable medium, such as a magnetic or optical disk.

The storage device 1806 is capable of providing mass storage for the computing device 1800. In one implementation, the storage device 1806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1804, the storage device 1806, or memory on processor 1802.

The high speed controller 1808 manages bandwidth-intensive operations for the computing device 1800, while the low speed controller 1812 manages lower bandwidth-intensive operations. Such allocation of functions is exemplary only. In one implementation, the high-speed controller 1808 is coupled to memory 1804, display 1816 (e.g., through a graphics processor or accelerator), and to high-speed expansion ports 1810, which may accept various expansion cards (not shown). In the implementation, low-speed controller 1812 is coupled to storage device 1806 and low-speed expansion port 1814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1800 may be implemented in a number of different forms, as shown in the figure. For example, it may be implemented as a standard server 1820, or multiple times in a group of such servers. It may also be implemented as part of a rack server system 1824. In addition, it may be implemented in a personal computer such as a laptop computer 1822. Alternatively, components from computing device 1800 may be combined with other components in a mobile device (not shown), such as device 1850. Each of such devices may contain one or more of computing device 1800, 1850, and an entire system may be made up of multiple computing devices 1800, 1850 communicating with each other.

Computing device 1850 includes a processor 1852, memory 1864, an input/output device such as a display 1854, a communication interface 1866, and a transceiver 1868, among other components. The device 1850 may also be provided with a storage device, such as a microdrive or other device, to provide additional storage. Each of the components 1850, 1852, 1864, 1854, 1866, and 1868, are interconnected using various buses, and several of the components may be mounted on a common motherboard or in other manners as appropriate.

The processor 1852 can execute instructions within the computing device 1850, including instructions stored in the memory 1864. The processor may be implemented as a chipset of chips that include separate and multiple analog and digital processors. The processor may provide, for example, for coordination of the other components of the device 1850, such as control of user interfaces, applications run by device 1850, and wireless communication by device 1850.

Processor 1852 may communicate with a user through control interface 1858 and display interface 1856 coupled to a display 1854. The display 1854 may be, for example, a TFT LCD (Thin-Film-Transistor Liquid Crystal Display) or an OLED (Organic Light Emitting Diode) display, or other appropriate display technology. The display interface 1856 may comprise appropriate circuitry for driving the display 1854 to present graphical and other information to a user. The control interface 1858 may receive commands from a user and convert them for submission to the processor 1852. In addition, an external interface 1862 may be provide in communication with processor 1852, so as to enable near area communication of device 1850 with other devices. External interface 1862 may provide, for example, for wired communication in some implementations, or for wireless communication in other implementations, and multiple interfaces may also be used.

The memory 1864 stores information within the computing device 1850. The memory 1864 can be implemented as one or more of a computer-readable medium or media, a volatile memory unit or units, or a non-volatile memory unit or units. Expansion memory 1874 may also be provided and connected to device 1850 through expansion interface 1872, which may include, for example, a SIMM (Single In Line Memory Module) card interface. Such expansion memory 1874 may provide extra storage space for device 1850, or may also store applications or other information for device 1850. Specifically, expansion memory 1874 may include instructions to carry out or supplement the processes described above, and may include secure information also. Thus, for example, expansion memory 1874 may be provide as a security module for device 1850, and may be programmed with instructions that permit secure use of device 1850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1864, expansion memory 1874, or memory on processor 1852, that may be received, for example, over transceiver 1868 or external interface 1862.

Device 1850 may communicate wirelessly through communication interface 1866, which may include digital signal processing circuitry where necessary. Communication interface 1866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1868. In addition, short-range communication may occur, such as using a Bluetooth, WiFi, or other such transceiver (not shown). In addition, GPS (Global Positioning System) receiver module 1870 may provide additional navigation- and location-related wireless data to device 1850, which may be used as appropriate by applications running on device 1850.

Device 1850 may also communicate audibly using audio codec 1860, which may receive spoken information from a user and convert it to usable digital information. Audio codec 1860 may likewise generate audible sound for a user, such as through a speaker, e.g., in a handset of device 1850. Such sound may include sound from voice telephone calls, may include recorded sound (e.g., voice messages, music files, etc.) and may also include sound generated by applications operating on device 1850.

The computing device 1850 may be implemented in a number of different forms, as shown in the figure. For example, it may be implemented as a cellular telephone 1880. It may also be implemented as part of a smart phone 1882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computing device comprising:
    a mode-selection input device having a first state and a second state; and
    firmware operably coupled with the mode-selection input device, wherein:
        when the mode-selection input device is in the first state, the firmware is configured to cause the computing device to:
            determine whether machine-readable instructions executed by the computing device are digitally signed by a trusted supplier of an operating system of the computing device, and
            wherein:
                when the machine-readable instructions are digitally signed by the trusted supplier, the computing device is configured to execute the machine-readable instructions; and
                when the machine-readable instructions are not digitally signed by the trusted supplier, the computing device is configured to execute a recovery procedure to install machine-readable instructions that are digitally signed by the trusted supplier on the computing device; and
        when the mode-selection input device is in the second state, the firmware is configured to cause the computing device to operate in a developer mode, such that the computing device executes machine-readable instructions that are not digitally signed by the trusted supplier, the computing device being configured to determine the state of the mode-selection input device upon the computing device resuming operation from a suspend mode.

2. The computing device of claim 1, wherein the mode-selection input device comprises a mode-selection switch.

3. The computing device of claim 2, further comprising a removable cover, the removable cover being configured to conceal the mode-selection switch when the cover is in place on the computing device.

4. The computing device of claim 2, further comprising a battery, wherein the mode-selection switch is located underneath the battery of the computing device.

5. The computing device of claim 1, wherein the machine-readable instructions comprise at least a portion of the operating system of the computing device.

6. The computing device of claim 1, wherein determining whether the machine-readable instructions executed by the computing device are digitally signed by the trusted supplier comprises determining whether at least a portion of an operating system kernel of the computing device is digitally signed by the trusted supplier.

7. The computing device of claim 1, wherein executing the recovery procedure comprises:
    displaying, by the computing device, instructions for:
        obtaining and storing a recovery image on a removable storage device; and
        operably coupling the removable storage device with the computing device after storing the recovery image thereon;
    verifying the recovery image stored on the removable storage device is digitally signed by the trusted supplier; and
    installing the recovery image onto the computing device from the removable storage device, wherein the recovery image replaces a previous image.

8. The computing device of claim 1, wherein the computing device is configured to determine the state of the mode-selection input device upon booting the computing device.

9. The computing device of claim 1, further comprising a recovery mode selection device, the computing device being configured to execute the recovery procedure in response to engagement of the recovery mode selection device.

10. The computing device of claim 1, wherein the computing device is configured to execute the recovery procedure in response to one of a recovery-mode selection device and determining the machine-readable instructions are not digitally signed by the trusted supplier, the recovery procedure comprising:
    determining a state of the mode-selection input device;
    if the mode-selection input device is in the first state:
        locating an image stored on a removable storage device coupled with the computing device;
        determining if the image is digitally signed by the trusted supplier;
        if the image is digitally signed by the trusted supplier, replacing a current image on the computing device with the image stored on the removable storage device; and
        if the image is not digitally signed by the trusted suppler, displaying, by the computing device, an indication that the image stored on the removable storage device is not a trusted image.

11. The computing device of claim 1, wherein the computing device is configured to execute the recovery procedure in response to one of a recovery-mode selection device and determining the machine-readable instructions are not digitally signed by the trusted supplier, the recovery procedure comprising:

determining a state of the mode-selection input device;

if the mode-selection input device is in the second state:

locating an image stored on a removable storage device coupled with the computing device;

determining if the image is digitally signed by the trusted supplier;

if the image is digitally signed by the trusted supplier, replacing a current image on the computing device with the image stored on the removable storage device;

if the image is not digitally signed by the trusted supplier:

determining if a digital signature of the image stored on the removable storage device matches a digital signature of the current image of the computing device;

if the digital signature of the image stored on the removable storage device matches the digital signature of the current image of the computing device, replacing the current image on the computing device with the image stored on the removable storage device; and if the digital signature of the image stored on the removable storage device does not match the digital signature of the current image of the computing device, executing a new image installation procedure.

12. The computing device of claim 11, wherein the new image installation procedure comprises:

displaying, by the computing device, for a predetermined period of time, a notification that the image stored on the removable storage device is not digitally signed by the trusted supplier; and replacing the current image on the computing device with the image stored on the removable storage device after the predetermined period of time has elapsed.

13. The computing device of claim 12, wherein the new image installation procedure further comprises requesting user input during the predetermined period of time.

14. The computing device of claim 12, wherein the predetermined period of time is more than approximately five minutes.

15. The computing device of claim 12, wherein the new image installation procedure further comprises playing an audio notification during the predetermined period of time.

16. The computing device of claim 1, wherein operating in the developer mode comprises:

determining if an operating system kernel of the computing device is digitally signed by the trusted supplier; and when the operating system kernel of the computing device is digitally signed by the trusted supplier:

halting operation of the computing device;

displaying, by the computing device, instructions for changing the mode-selection input device from the second state to the first state; and resuming operation of the computing device in response to the mode-selection input device being changed to the first state.

17. The computing device of claim 1, wherein operating in the developer mode comprises:

determining if an operating system kernel of the computing device is digitally signed by the trusted supplier; and when the operating system kernel of the computing device is not digitally signed by the trusted supplier:

displaying, by the computing device, a notification that the computing device is running an operating system that is not digitally signed by the trusted supplier.

18. The computing device of claim 17, wherein operating in the developer mode when the operating system kernel of the computing device is not digitally signed by the trusted supplier further comprises:

displaying the notification for a predetermined period of time;

playing an audio notification during the predetermined period of time; and booting the computing device after the predetermined period of time.

19. The computing device of claim 18, wherein the predetermined period of time is more than approximately thirty seconds.

20. The computing device of claim 18, wherein operating in the developer mode if the operating system kernel of the computing device is not digitally signed by the trusted supplier further comprises:

bypassing the displayed notification and the audio notification in response to entry of a specific key sequence on the computing device.

21. The computing device of claim 20, wherein operating in the developer mode when the operating system kernel of the computing device is not digitally signed by the trusted supplier further comprises initiating the recovery procedure in response to entry of a key sequence other than the specific key sequence for bypassing the displayed notification.

22. The computing device of claim 1, wherein the state of the mode-selection input device is changed by scanning a bar code.

23. The computing device of claim 1, further comprising a recovery mode selection device, wherein:

the computing device is configured to execute the recovery procedure in response to engagement of the recovery mode selection device; and in the event the mode-selection input device is in the second state prior to engagement of the recovery mode selection device, engagement of the recovery mode selection device changes the mode-selection input device from the second state to the first state.

24. The computing device of claim 1, wherein the firmware comprises executable instructions that, when executed by the computing device, provide for determining the state of the mode-selection input device.

25. The computing device of claim 24, wherein the firmware comprises:

a write-protected portion comprising a boot-stub and instructions for executing the recovery procedure for the computing device; and a writeable portion including one or more boot images for the computing device.

26. The computing device of claim 25, wherein the computing device is configured such that a circuit modification to a system board of the computing device allows for writing of the write-protected portion of the firmware.

27. A computer implemented method, comprising:

determining, by a computing device, a state of a mode-selection input device of the computing device, the mode-selection input device having a first state and a second state;

when the mode-selection input device is in the first state, operating the computing device in a user mode, the user mode comprising:

determining whether machine-readable instructions executed by the computing device are digitally signed by a trusted supplier of an operating system of the computing device, wherein:
when the machine-readable instructions are digitally signed by the trusted supplier, executing, by the computing device, the machine-readable instructions; and
when the machine-readable instructions are not digitally signed by the trusted supplier, executing, by the computing device, a recovery procedure to install an operating system recovery image on the computing device; and when the mode-selection input device is in the second state, operating the computing device in a developer mode including:
operating the computing device so as to execute machine-readable instructions that are not digitally signed by the trusted supplier;
determining if an operating system kernel of the computing device is digitally signed by the trusted supplier; and
when the operating system kernel of the computing device is not digitally signed by the trusted supplier:
displaying, by the computing device, a notification that the computing device is running an operating system that is not digitally signed by the trusted supplier.

28. The method of claim 27, wherein determining whether the machine-readable instructions executed by the computing device are digitally signed by the trusted supplier comprises determining whether at least a portion of the operating system kernel of the computing device is digitally signed by the trusted supplier.

29. The method of claim 27, wherein executing the recovery procedure comprises:
displaying, by the computing device, instructions for:
obtaining and storing a recovery image on a removable storage device; and
operably coupling the removable storage device with the computing device after storing the recovery image thereon;
verifying the recovery image stored on the removable storage device is digitally signed by the trusted supplier; and
installing the recovery image onto the computing device from the removable storage device, wherein the recovery image replaces a previous image.

30. The method of claim 27, further comprising, determining the state of the mode-selection input device upon booting the computing device.

31. The method of claim 27, further comprising, determining the state of the mode-selection input device upon the computing device resuming operation from a suspend mode.

32. The method of claim 27, further comprising, executing the recovery procedure in response to engagement of a recovery mode selection device of the computing device.

33. The method of claim 27, further comprising, executing the recovery procedure in response to one of a recovery-mode selection device and determining the machine-readable instructions are not digitally signed by the trusted supplier, the recovery procedure comprising:
determining a state of the mode-selection input device;
if the mode-selection input device is in the first state:
locating an image stored on a removable storage device coupled with the computing device;
determining if the image is digitally signed by the trusted supplier;
if the image is digitally signed by the trusted supplier, replacing a current image on the computing device with the image stored on the removable storage device; and
if the image is not digitally signed by the trusted supplier, displaying, by the computing device, an indication that the image stored on the removable storage device is not a trusted image.

34. The method of claim 27, further comprising, executing the recovery procedure in response to one of a recovery-mode selection device and determining the machine-readable instructions are not digitally signed by the trusted supplier, the recovery procedure comprising:
determining a state of the mode-selection input device;
if the mode-selection input device is in the second state:
locating an image stored on a removable storage device coupled with the computing device;
determining if the image is digitally signed by the trusted supplier;
if the image is digitally signed by the trusted supplier, replacing a current image on the computing device with the image stored on the removable storage device;
if the image is not digitally signed by the trusted supplier:
determining if a digital signature of the image stored on the removable storage device matches a digital signature of the current image of the computing device;
if the digital signature of the image stored on the removable storage device matches the digital signature of the current image of the computing device, replacing the current image on the computing device with the image stored on the removable storage device; and
if the digital signature of the image stored on the removable storage device does not match the digital signature of the current image of the computing device, executing a new image installation procedure.

35. The method of claim 27, wherein operating in the developer mode further comprises:
if the operating system kernel of the computing device is digitally signed by the trusted supplier:
halting operation of the computing device;
displaying, by the computing device, instructions for changing the mode-selection input device from the second state to the first state; and
resuming operation of the computing device in response to the mode-selection input device being changed to the first state.

36. The method of claim 35, wherein operating in the developer mode when the operating system kernel of the computing device is not digitally signed by the trusted supplier further comprises:
displaying the notification for a predetermined period of time;
playing an audio notification during the predetermined period of time; and
booting the computing device after the predetermined period of time.

37. The method of claim 36, wherein operating in the developer mode if the operating system kernel of the computing device is not digitally signed by the trusted supplier further comprises:

bypassing the displayed notification and the audio notification in response to entry of a specific key sequence on the computing device.

38. The method of claim 37, wherein operating in the developer mode when the operating system kernel of the computing device is not digitally signed by the trusted supplier further comprises initiating the recovery procedure in response to entry of a key sequence other than the specific key sequence for bypassing the displayed notification.

39. A computing device, comprising:
a mode-selection switch having a first position and a second position; and
firmware operably coupled with the mode-selection switch, wherein:
when the mode-selection switch is in the first position, the firmware is configured to cause the computing device to:
determine whether machine-readable instructions executed by the computing device are digitally signed by a trusted supplier of an operating system of the computing device, and
wherein:
when the machine-readable instructions are digitally signed by the trusted supplier, the computing device is configured to execute the machine-readable instructions; and
when the machine-readable instructions are not digitally signed by the trusted supplier, the computing device is configured to execute a recovery procedure to install an operating system recovery image on the computing device; and
when the mode-selection switch in the second position, the firmware is configured to cause the computing device to operate in a developer mode, such that the computing device executes machine-readable instructions that are not digitally signed by the trusted supplier.

40. The computing device of claim 39, further comprising a removable cover, the removable cover being configured to conceal the mode-selection switch when the cover is in place on the computing device.

41. The computing device of claim 39, further comprising a battery, wherein the mode-selection switch is located underneath the battery of the computing device.

42. The computing device of claim 39, wherein the machine-readable instructions comprise at least a portion of the operating system of the computing device.

43. The computing device of claim 39, further comprising a recovery mode selection device, wherein:
the computing device is configured to execute the recovery procedure in response to engagement of the recovery mode selection device; and
in the event the mode-selection switch is in the second position prior to engagement of the recovery mode selection device, engagement of the recovery mode selection device changes the mode-selection switch from the second position to the first position.

44. The computing device of claim 39, wherein the firmware comprises executable instructions that, when executed by the computing device, provide for determining the position of the mode-selection switch.

45. The computing device of claim 44, wherein the firmware comprises:
a write-protected portion comprising a boot-stub and instructions for executing the recovery procedure for the computing device; and
a writeable portion including one or more boot images for the computing device.

46. The computing device of claim 45, wherein the computing device is configured such that a circuit modification to a system board of the computing device allows for writing of the write-protected portion of the firmware.

47. A computing device, comprising:
a mode-selection switch having a first position and a second position; and
firmware operably coupled with the mode-selection switch, wherein:
when the mode-selection switch is in the first position, the firmware is configured to cause the computing device to:
determine whether machine-readable instructions executed by the computing device are digitally signed by a trusted supplier of an operating system of the computing device, and
wherein:
when the machine-readable instructions are digitally signed by the trusted supplier, the computing device is configured to execute the machine-readable instructions; and
when the machine-readable instructions are not digitally signed by the trusted supplier, the computing device is configured to execute a recovery procedure to install an operating system recovery image on the computing device; and
when the mode-selection switch in the second position, the firmware is configured to cause the computing device to operate in a developer mode, such that the computing device executes machine-readable instructions that are not digitally signed by the trusted supplier,
wherein the computing device is configured to execute the recovery procedure in response to one of a recovery-mode selection device and determining the machine-readable instructions are not digitally signed by the trusted supplier, the recovery procedure comprising:
determining a state of the mode-selection switch;
if the mode-selection switch is in the second position:
locating an image stored on a removable storage device coupled with the computing device;
determining if the image is digitally signed by the trusted supplier;
if the image is digitally signed by the trusted supplier, replacing a current image on the computing device with the image stored on the removable storage device;
if the image is not digitally signed by the trusted supplier:
determining if a digital signature of the image stored on the removable storage device matches a digital signature of the current image of the computing device;
if the digital signature of the image stored on the removable storage device matches the digital signature of the current image of the computing device, replacing the current image on the computing device with the image stored on the removable storage device; and
if the digital signature of the image stored on the removable storage device does not match the digital signature of the current image of the computing device, executing a new image installation procedure.

48. The computing device of claim 47, wherein the new image installation procedure comprises:
- displaying, by the computing device, for a predetermined period of time, a notification that the image stored on the removable storage device is not digitally signed by the trusted supplier; and
- replacing the current image on the computing device with the image stored on the removable storage device after the predetermined period of time has elapsed.

49. The computing device of claim 48, wherein the predetermined period of time is more than approximately five minutes.

50. The computing device of claim 48, wherein the new image installation procedure further comprises playing an audio notification during the predetermined period of time.

51. The computing device of claim 48, wherein the new image installation procedure further comprises requesting user input during the predetermined period of time.

* * * * *